(12) United States Patent
Chen et al.

(10) Patent No.: US 10,524,249 B2
(45) Date of Patent: Dec. 31, 2019

(54) DATA TRANSMISSION METHOD AND APPARATUS

(71) Applicant: ZTE CORPORATION, Guangdong (CN)

(72) Inventors: Xianming Chen, Guangdong (CN); Bo Dai, Guangdong (CN); Jing Shi, Guangdong (CN); Shuqiang Xia, Guangdong (CN); Wen Zhang, Guangdong (CN); Huiying Fang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/028,285

(22) Filed: Jul. 5, 2018

(65) Prior Publication Data

US 2019/0007932 A1 Jan. 3, 2019

Related U.S. Application Data

(63) Continuation of application No. 16/061,628, filed as application No. PCT/CN2016/104924 on Nov. 7, 2016.

(30) Foreign Application Priority Data

Dec. 16, 2015 (CN) .......................... 2015 1 0945120
Jan. 11, 2016 (CN) .......................... 2016 1 0018654

(51) Int. Cl.
*H04W 72/04* (2009.01)
*H04L 27/26* (2006.01)
*H04L 5/00* (2006.01)

(52) U.S. Cl.
CPC ......... *H04W 72/042* (2013.01); *H04L 5/0048* (2013.01); *H04L 27/2605* (2013.01); *H04W 72/0446* (2013.01)

(58) Field of Classification Search
CPC ... H04L 5/0023; H04L 5/0048; H04L 5/0062; H04L 27/2605; H04L 27/2613; H04L 72/0446; H04L 72/042
(Continued)

(56) References Cited

U.S. PATENT DOCUMENTS

2011/0237267 A1* 9/2011 Chen ...................... H04J 11/003
455/450
2012/0014320 A1* 1/2012 Nam ...................... H04L 1/1671
370/328
(Continued)

FOREIGN PATENT DOCUMENTS

CN 102957654 A 3/2013

OTHER PUBLICATIONS

Extended European Search Report dated Nov. 26, 2018, in corresponding European Application No. 16874664.2.
(Continued)

*Primary Examiner* — Phong La
(74) *Attorney, Agent, or Firm* — Duane Morris LLP

(57) ABSTRACT

The present invention provides a data transmission method and apparatus. The method includes: transmitting physical downlink channel data according to a first-type reference signal (RS) or a second-type RS or a third-type RS. The method of the present invention ensures a balance between data transmission performance and RS overheads for different NarrowBand-Internet Of Things (NB-IOT) physical downlink channel data, thereby resolving the problem in the related art of not knowing which RS is to be used to transmit NB-IOT physical channel data.

13 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0106493 A1* | 5/2012 | Noh | ...................... | H04L 5/0007 370/329 |
| 2014/0171097 A1* | 6/2014 | Fischer | ................ | H04W 64/00 455/456.1 |
| 2014/0198675 A1* | 7/2014 | He | ........................ | H04L 5/0048 370/252 |
| 2014/0247775 A1* | 9/2014 | Frenne | ................. | H04L 5/0048 370/329 |
| 2015/0063234 A1* | 3/2015 | Park | ....................... | H04B 7/024 370/329 |
| 2015/0078327 A1* | 3/2015 | Medbo | ................. | H04L 5/0035 370/330 |
| 2015/0098437 A1* | 4/2015 | Chen | ..................... | H04W 16/14 370/330 |
| 2015/0189677 A1* | 7/2015 | Han | .................. | H04W 74/0833 370/329 |
| 2016/0226637 A1* | 8/2016 | Nory | ..................... | H04L 5/0053 |

OTHER PUBLICATIONS

Huawei et al., "NB-IOT—downlink physical layer concept description", 3GPP TSG RAN WG1 Meeting #83, Nov. 22, 2015, Anaheim, CA,USA, R1-156462, 11 pages.

Ericsson, "NB-IOT—DL Design", 3GPP TSG-RAN WG1 #83, Nov. 15-22, 2015, Anaheim, CA, USA, R1-1574719, 11 pages.

Samsung, "Narrowband IOT—Downlink Control/Data Channel Design", 3GPP TSG RAN WG1 Meeting #82bis, Oct. 5-9, 2015, Malmo, Sweden, R1-155512, 7 pages.

International Search Report dated Jan. 24, 2017, in corresponding International Application No. PCT/CN2016/104924.

\* cited by examiner (a) In-band operation (b) Non-in-band operation

▓ LTE PDCCH
■ LTE CRS (third-type RS) Port 0, 1
▨ Third-type RS Port 0, 1

DATA TRANSMISSION METHOD AND APPARATUS

CROSS-REFERENCE TO RELATED APPLICATIONS

The application is a continuation of U.S. application Ser. No. 16/061,628 entitled "Data Transmission Method and Apparatus" filed on Jun. 12, 2018, which is a National Phase of PCT Application No. PCT/CN2016/104924 filed on Nov. 7, 2016, which are each incorporated by reference herein in their entireties.

BACKGROUND

Technical Field

The present invention relates to the communications field, and more particularly, to a data transmission method and apparatus.

Related Art

To satisfy the requirements of Cellular Internet Of Things (C-IOT), a new access system that was designed and named NarrowBand-Cellular Internet Of Things (NB-IOT) was proposed and agreed upon in the RAN#69 plenary meeting of the 3rd Generation Partnership Project (3GPP). An NB-IOT system focuses on a low-complexity and low-throughput radio-frequency access technology, and major research objectives of the technology include: improved indoor coverage, support for a massive number of low-throughput user equipments, low delay sensitivity, ultra-low device costs, low power loss of devices, and a network architecture. An uplink transmission bandwidth and a downlink transmission bandwidth of the NB-IOT system are both 180 kHz, and are the same as a bandwidth of one physical resource block (PRB) of a Long Term Evolution (LTE) system. This facilitates the reuse of related designs of an existing LTE system in the NB-IOT system.

The NB-IOT system supports three different operation modes: 1) Stand-alone operation, for example, using a spectrum that is currently used by a GSM EDGE Radio Access Network (GERAN) system to replace one or more GSM carriers. 2) Guard band operation, for example, using an unused resource block within a guard band of an LTE carrier. 3) In-band operation, for example, using a resource block within a normal LTE carrier. There is at present still no effective solution to the problem of using which reference signal (RS) in the different operation modes to transmit NB-IOT physical channel data, for example, physical broadcast channel (PBCH) data, physical downlink shared channel (PDSCH) data, and physical downlink control channel (PDCCH) data.

SUMMARY

Embodiments of the present invention provide a data transmission method and apparatus, so as to resolve at least the problem in the related art of not knowing which RS is to be used to transmit NB-IOT physical channel data.

According to an aspect of the embodiments of the present invention, a data transmission method is provided, including: transmitting physical downlink channel data according to an RS, where the RS includes a first-type RS, a second-type RS, and a third-type RS.

Optionally, a pattern of the first-type RS does not overlap a pattern of an LTE system cell-specific RS (CRS); a pattern of the second-type RS is the same as the pattern of the LTE system CRS, or the pattern of the second-type RS is a subset of the pattern of the LTE system CRS; and a pattern of the third-type RS is a superposition of the pattern of the first-type RS and the pattern of the second-type RS.

Optionally, the RS is an RS of two ports.

Optionally, in an in-band operation, when the physical downlink channel data is transmitted according to the second-type RS and an LTE system CRS of four ports is configured, the second-type RS is an LTE system CRS of two specified ports, where the two specified ports are port 0 and port 1 or port 0 and port 2 or port 1 and port 3.

Optionally, when the physical downlink channel data is transmitted according to the third-type RS, the third-type RS is a superposition of the second-type RS of two ports and the first-type RS of two ports, where a first port of the first-type RS and a first port of the second-type RS are a same port, and a second port of the first-type RS and a second port of the second-type RS are a same port.

Optionally, in the in-band operation, when the LTE system CRS of four ports is configured, the second-type RS of two ports is an LTE system CRS of two specified ports, where the two specified ports are port 0 and port 1 or port 0 and port 2 or port 1 and port 3.

Optionally, the two specified ports are fixed to be port 0 and port 1; or, the two specified ports change as subframes change, where when the two specified ports change as subframes change, the two specified ports are port 0 and port 2 in some subframes and are port 1 and port 3 in some other subframes.

Optionally, that a pattern of the first-type RS does not overlap a pattern of an LTE system CRS includes: when a subframe in which the physical downlink channel data is transmitted is a normal subframe, the first-type RS occupies positions of four LTE system CRS orthogonal frequency-division multiplexing (OFDM) symbols in the time domain, where each OFDM symbol occupies four resource units; or, the first-type RS occupies in time domain four LTE system OFDM symbols which do not contain CRS, where each OFDM symbol occupies four resource units; or, the first-type RS occupies eight OFDM symbols in time domain, wherein the eight OFDM symbols include LTE system OFDM symbols which contain CRS and LTE system OFDM symbols which do not contain CRS, and each OFDM symbol occupies two resource units.

Optionally, that a pattern of the first-type RS does not overlap a pattern of an LTE system CRS includes: when a subframe in which the physical downlink channel data is transmitted is a time-division duplex (TDD) system special subframe, the first-type RS occupies in time domain one or two LTE system OFDM symbols which contain CRS, where each OFDM symbol occupies four resource units; or, the first-type RS occupies in time domain one or two LTE system OFDM symbols which do not contain CRS, where each OFDM symbol occupies four resource units; or, the first-type RS occupies in time domain four LTE system OFDM symbols do not contain CRS, where each OFDM symbol occupies two or four resource units; or, the first-type RS occupies four OFDM symbols in time domain, where the four OFDM symbols include LTE system OFDM symbols which contain CRS and LTE system OFDM symbols which do not contain CRS, and each OFDM symbol occupies two or four resource units.

Optionally, when the OFDM symbols occupied by the first-type RS are all non-LTE system CRS OFDM symbols, the pattern of the first-type RS is fixed, or, the pattern of the first-type RS is determined according to a physical cell identity (PCID).

Optionally, when the OFDM symbols occupied by the first-type RS include non-LTE system CRS OFDM symbols and LTE system CRS OFDM symbols, a quantity of the non-LTE system CRS OFDM symbols is the same as a quantity of the LTE system CRS OFDM symbols, where the pattern of the first-type RS in the non-LTE system CRS OFDM symbol is fixed, and the pattern of the first-type RS in the LTE system CRS OFDM symbol is determined according to a PCID; or, the pattern of the first-type RS in the non-LTE system CRS OFDM symbol and the pattern of the first-type RS in the LTE system CRS OFDM symbol are both determined according to the PCID, and the pattern of the first-type RS in the non-LTE system CRS OFDM symbol has a fixed offset L with respect to the pattern of the first-type RS in the LTE system CRS OFDM symbol in the frequency domain, where L is an integer greater than or equal to 0.

Optionally, in an in-band operation and an out-of-band operation, when a same type of RS is used to transmit the physical downlink channel data, the physical downlink channel data is transmitted according to different patterns of the RS, where the out-of-band operation is a guard band operation or a stand-alone operation.

Optionally, when the physical downlink channel data is transmitted according to different patterns of the RS, a pattern of the RS in the out-of-band operation is a subset of a pattern of the RS in the in-band operation.

Optionally, a type of the RS used to transmit the physical downlink channel data is determined in at least one of the following manners: a manner of predefined configuration, a manner according to a coverage level and/or an aggregation level, and a manner of signaling indication.

Optionally, the method further includes: when the physical downlink channel data is transmitted according to the second-type RS of K2 ports, or, when the physical downlink channel data is transmitted according to the third-type RS and the pattern of the third-type RS is a superposition of the pattern of the first-type RS of K1 ports and the pattern of the second-type RS of K2 ports, mapping, by a transmit side, the K1 ports to the K2 ports according to a precoding matrix of dimension K2×K1, and obtaining, by a receive side, an equivalent channel coefficient of the K1 ports according to the precoding matrix of dimension K2×K1 and an estimated channel coefficient of the K2 ports, where K1 and K2 are integers greater than 0 and K1 is less than K2.

Optionally, an initialization interval of a sequence generator for the RS includes: $N_{init}$ subframes or radio frames, where $N_{init}$ is an integer greater than or equal to 1.

Optionally, an initialization value of the sequence generator for the RS is determined in at least one of the following manners: determining according to a PCID; determining according to the PCID and a cyclic prefix (CP) type; determining according to an interval sequence number of sequence initialization for the RS and the PCID; and determining according to the interval sequence number of sequence initialization for the RS, the PCID, and the CP type.

Optionally, the method further includes: in an in-band operation, a sequence value and/or a port quantity of the second-type RS or the third-type RS is indicated by using signaling.

Optionally, the method further includes: in an out-of-band operation, predefining a subframe for transmitting the RS and/or configuring a subframe for transmitting the RS by using signaling.

Optionally, in an out-of-band operation, a subframe for transmitting a synchronization signal (SS) is not used to transmit the RS; or, an OFDM symbol used to transmit the SS in the subframe for transmitting the SS is not used to transmit the RS.

Optionally, a sequence of the RS is a subsequence whose length is 2 in an LTE system CRS sequence whose length is $2N_{RB}^{max,DL}$, where $N_{RB}^{max,DL}$ represents a maximum downlink bandwidth configuration of an LTE system.

Optionally, values of parameters $m_0$ and $m_1$ are predefined or indicated by using signaling; and the sequence of the RS is obtained according to the parameters $m_0$ and $m_1$ and the following equation:

$$r_{l,n_s}(i) = \frac{1}{\sqrt{2}}(1 - 2 \cdot c(2m_i)) + j\frac{1}{\sqrt{2}}(1 - 2 \cdot c(2m_i + 1)), i = 0, 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

where $r_{l,n_s}(i)$ represents the sequence of the RS, $N_{ID}^{cell}$ represents a PCID, $n_s$ represents an index of a time slot, l represents an index of an OFDM symbol, $N_{CP}$ depends on a CP type and has a value 0 or 1, and $c_{init}$ represents an initialization value of a pseudorandom sequence c(·).

Optionally, the values of the parameters $m_0$ and $m_1$ are respectively predefined to be 0 and 1; or, the values of the parameters $m_0$ and $m_1$ are respectively predefined to be $N_{RB}^{max,DL}-1$ and $N_{RB}^{max,DL}$.

Optionally, when the values of the parameters $m_0$ and $m_1$ are indicated by using signaling, values $\{m_0, m_1\}$ of the parameters belong to a predefined set.

Optionally, when the RS is used to transmit PBCH data, and/or, in an out-of-band operation, when the RS is used to transmit PDCCH data and PDSCH data, the values of the parameters $m_0$ and $m_1$ are determined by using a predefining manner.

Optionally, a sequence of the RS used to transmit PBCH data is the same as a sequence of the RS used to transmit PDCCH data and PDSCH data in an out-of-band operation.

Optionally, in an in-band operation, when an LTE multicast and broadcast single frequency network (MBSFN) subframe in which no multicast and broadcast multimedia service (MBMS) service is transmitted is used to transmit NB-IOT physical downlink channel data, the RS is sent in an MBSFN area of the MBSFN subframe; and when an LTE MBSFN subframe in which no MBMS service is transmitted is not used to transmit the NB-IOT physical downlink channel data, the RS is not sent in an MBSFN area of the MBSFN subframe.

According to another aspect of the embodiments of the present invention, a data transmission apparatus is provided, including: a transmission module, configured to transmit physical downlink channel data according to an RS, where the RS includes a first-type RS, a second-type RS, and a third-type RS.

According to still another embodiment of the present invention, a storage medium is further provided. The storage medium is configured to store program code used to perform the following steps:

transmitting physical downlink channel data according to an RS, where the RS includes a first-type RS, a second-type RS, and a third-type RS.

By means of the embodiments of the present invention, physical downlink channel data is transmitted according to a first-type RS, a second-type RS or a third-type RS, so that a balance between data transmission performance and RS overheads is ensured for different NB-IOT physical downlink channel data, thereby resolving the problem in the related art of not knowing which RS is to be used to transmit NB-IOT physical channel data.

BRIEF DESCRIPTION OF THE DRAWINGS

The accompanying drawings shown herein are provided for further understanding of the present invention, and constitute a part of this application, and exemplary embodiments of the present invention and descriptions thereof are used for explaining the present invention, but do not constitute improper limitations to the present invention. In the accompanying drawings.

DETAILED DESCRIPTION

The present invention will be described in detail below through embodiments with reference to the accompanying drawings. It should be noted that the embodiments in this application and features in the embodiments can be combined with each other without causing any conflict.

It should be noted that the terms "first" and "second" in the specification, the claims, and the accompanying drawings of the present invention are used only to distinguish similar objects, and do not describe a specific relationship or sequence between the objects.

Figure 1:
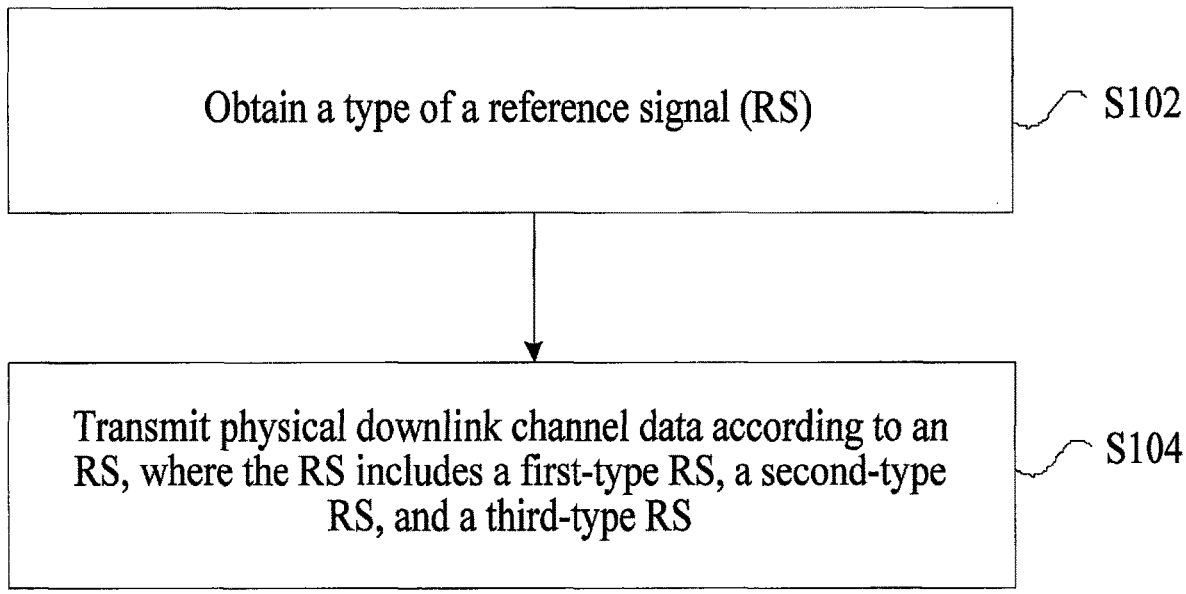
FIG. 1 is a flowchart of a data transmission method according to an embodiment of the present invention.

A data transmission method is provided in an embodiment. FIG. 1 is a flowchart of the data transmission method according to an embodiment of the present invention. As shown in FIG. 1, the process includes the following steps:

Step S102: Obtain a type of an RS.

Step S104: Transmit physical downlink channel data according to an RS, where the RS includes a first-type RS, a second-type RS, and a third-type RS.

By means of this embodiment, physical downlink channel data is transmitted according to a first-type RS, a second-type RS or a third-type RS, so that a balance between data transmission performance and RS overheads is ensured for different NB-IOT physical downlink channel data, thereby resolving the problem in the related art of not knowing which RS is to be used to transmit NB-IOT physical channel data.

It should be noted that, the foregoing step S102 is an optional step of the present invention. In a specific application scenario, the step may be omitted, or may be performed. In the step, the type of the RS used to transmit the physical downlink channel data may be determined in at least one of the following manners: a manner of predefined configuration, a manner according to a coverage level and/or an aggregation level, and a manner of signaling indication.

In addition, in this embodiment, a pattern of the first-type RS does not overlap a pattern of an LTE system CRS. The pattern of the LTE system CRS is a pattern of an LTE system CRS of four ports (the maximum quantity of ports of the LTE system CRS). A pattern of the second-type RS is the same as the pattern of the LTE system CRS, or the pattern of the second-type RS is a subset of the pattern of the LTE system CRS. The pattern of the LTE system CRS is a pattern of an LTE system CRS of two ports or a pattern of the LTE system CRS of four ports. A pattern of the third-type RS is a superposition of the pattern of the first-type RS and the pattern of the second-type RS. It should further be noted that, the pattern of the LTE system CRS in the present invention is a pattern of an LTE system CRS of a current cell. That is, the pattern of the LTE system CRS is determined according to a PCID of the current cell.

The RS mentioned in this embodiment may be an RS of two ports or an RS of four ports.

Using two ports as an example, when the pattern of the first-type RS is for two ports, the pattern of the first-type RS does not overlap a pattern of the LTE system CRS of four ports. When the pattern of the second-type RS is for two ports, the pattern of the second-type RS is the same as a pattern of an LTE system CRS of two ports (for example, port 0 and port 1), or is a subset of the pattern of the LTE system CRS of two ports (for example, port 0 and port 1). When the pattern of the third-type RS is for two ports, the pattern of the third-type RS is a superposition of the pattern of the first-type RS of two ports and the pattern of the second-type RS of two ports.

Using four ports as an example, when the pattern of the first-type RS is for four ports, the pattern of the first-type RS does not overlap a pattern of the LTE system CRS of four ports. When the pattern of the second-type RS is for four ports, the pattern of the second-type RS is the same as a pattern of the LTE system CRS of four ports, or is a subset of the pattern of the LTE system CRS of four ports. When the pattern of the third-type RS is for four ports, the pattern of the third-type RS is a superposition of the pattern of the first-type RS of four ports and the pattern of the second-type RS of four ports.

Based on that the RS mentioned in this embodiment is an RS of two ports, in an optional implementation of this embodiment, in an in-band operation, when the physical downlink channel data is transmitted according to the second-type RS, the second-type RS is an LTE system CRS of two specified ports. When the LTE system CRS of two ports is configured, the two specified ports are port 0 and port 1. When the LTE system CRS of four ports is configured, the two specified ports are port 0 and port 1 or port 0 and port 2 or port 1 and port 3. In addition, when the LTE system CRS of four ports is configured, the mentioned two specified ports are fixed to be port 0 and port 1; or the two specified ports change as subframes change. When the two specified ports change as subframes change, the two specified ports are port 0 and port 2 in some subframes and are port 1 and port 3 in some other subframes. For example, if four consecutive subframes are used to transmit the physical downlink channel data, port 0 and port 1 may be fixedly used for the four subframes, or, port 0 and port 2 are used for the first two subframes, and port 1 and port 3 are used for the last two subframes. The use of the manner of fixedly setting the two specified ports has low implementation complexity and facilitates general design in different operation modes. The use of the two specified ports that change as subframes change facilitates the obtaining of a spatial diversity gain. A physical downlink channel may be a PDCCH channel or a PDSCH channel. By means of the foregoing manner, in the in-band operation, regardless of whether the LTE system CRS of two ports or four ports is configured by a base station, the LTE system CRS of two ports is used as the second-type RS, thereby reducing the implementation complexity of a terminal device.

When the physical downlink channel data is transmitted according to the third-type RS, the third-type RS is a superposition of the second-type RS of two ports and the first-type RS of two ports, where a first port of the first-type RS and a first port of the second-type RS are a same port, and a second port of the first-type RS and a second port of the second-type RS are a same port. That is, a physical antenna for transmitting an RS of the first port of the first-type RS is always the same as a physical antenna for transmitting an RS of the first port of the second-type RS, and a physical antenna for transmitting an RS of the second port of the first-type RS is always the same as a physical antenna for transmitting an RS of the second port of the second-type RS. In addition, in the in-band operation, the second-type RS is an LTE system CRS of two specified ports. When the LTE system CRS of two ports is configured, the two specified ports are port 0 and port 1. When the LTE system CRS of four ports is configured, the two specified ports are port 0 and port 1 or port 0 and port 2 or port 1 and port 3. In addition, when the LTE system CRS of four ports is configured, the mentioned two specified ports are fixed to be port 0 and port 1; or the two specified ports change as subframes change. When the two specified ports change as subframes change, the two specified ports are port 0 and port 2 in some subframes and are port 1 and port 3 in some other subframes. For example, if four consecutive subframes are used to transmit the physical downlink channel data, port 0 and port 1 may be fixedly used for the four subframes, or, port 0 and port 2 are used for the first two subframes, and port 1 and port 3 are used for the last two subframes. The use of the manner of fixedly setting the two specified ports has low implementation complexity and facilitates general design in different operation modes. The use of the two specified ports that change as subframes change facilitates the obtaining of a spatial diversity gain.

It should be noted that, unless otherwise specified, the patterns of an RS and a CRS in the present invention are both patterns within the range of a subframe in which there is RS transmission. The so-called pattern involves only a resource unit position occupied by an RS, but does not involve specifically which port of the RS occupies the resource unit position.

Based on that the first-type RS mentioned in this embodiment is an RS of two ports, in an optional implementation of this embodiment, that a pattern of the first-type RS does not overlap a pattern of an LTE system CRS mentioned in this embodiment includes: when a subframe in which the physical downlink channel data is transmitted is a normal subframe, the first-type RS occupies positions of four LTE system CRS OFDM symbols in the time domain, where each OFDM symbol occupies four resource units; or, the first-type RS occupies positions of four non-LTE system CRS OFDM symbols in the time domain, where each OFDM symbol occupies four resource units; or, the first-type RS occupies positions of eight OFDM symbols in the time domain, where the eight OFDM symbols include LTE system CRS and non-LTE system CRS OFDM symbols, and each OFDM symbol occupies two resource units.

Based on that the first-type RS mentioned in this embodiment is an RS of two ports, in another optional implementation of this embodiment, that a pattern of the first-type RS does not overlap a pattern of an LTE system CRS mentioned in this embodiment includes: when a subframe in which the physical downlink channel data is transmitted is a TDD system special subframe, the first-type RS occupies positions of one or two LTE system CRS OFDM symbols in the time domain, where each OFDM symbol occupies four resource units; or, the first-type RS occupies positions of one or two non-LTE system CRS OFDM symbols in the time domain, where each OFDM symbol occupies four resource units; or, the first-type RS occupies positions of four non-LTE system CRS OFDM symbols in the time domain, where each OFDM symbol occupies two or four resource units; or, the first-type RS occupies positions of four OFDM symbols in the time domain, where the four OFDM symbols include LTE system CRS and non-LTE system CRS OFDM symbols, and each OFDM symbol occupies two or four resource units.

In addition, in this embodiment, when the OFDM symbols occupied by the first-type RS are all non-LTE system CRS OFDM symbols, the pattern of the first-type RS is fixed, or, the pattern of the first-type RS is determined according to a PCID.

When the OFDM symbols occupied by the first-type RS include non-LTE system CRS OFDM symbols and LTE system CRS OFDM symbols, a quantity of the non-LTE system CRS OFDM symbols is the same as a quantity of the LTE system CRS OFDM symbols. The pattern of the first-type RS in the non-LTE system CRS OFDM symbol is fixed, and the pattern of the first-type RS in the LTE system CRS OFDM symbol is determined according to the PCID; or, the pattern of the first-type RS in the non-LTE system CRS OFDM symbol and the pattern of the first-type RS in the LTE system CRS OFDM symbol are both determined according to the PCID, and the pattern of the first-type RS in the non-LTE system CRS OFDM symbol has a fixed offset L with respect to the pattern of the first-type RS in the LTE system CRS OFDM symbol in the frequency domain, where L is an integer greater than or equal to 0.

It should be noted that, in an in-band operation and an out-of-band operation, when a same type of RS is used to transmit the physical downlink channel data, the physical downlink channel data is transmitted according to different patterns of the RS. The out-of-band operation is a guard band operation or a stand-alone operation. When the physical downlink channel data is transmitted according to different patterns of the RS, a pattern of the RS in the out-of-band operation may be a subset of a pattern of the RS in the in-band operation.

In this embodiment, when the physical downlink channel data is transmitted according to the second-type RS of K2 ports, or when the physical downlink channel data is transmitted according to the third-type RS and the pattern of the third-type RS is a superposition of the pattern of the first-type RS of K1 ports and the pattern of the second-type RS of K2 ports, a transmit side maps the K1 ports to the K2 ports according to a precoding matrix of dimension K2×K1, and a receive side obtains an equivalent channel coefficient of the K1 ports according to the precoding matrix of dimension K2×K1 and an estimated channel coefficient of the K2 ports, where K1 and K2 are integers greater than 0 and K1 is less than K2. By means of the method, when the physical downlink channel data is transmitted according to the second-type RS or the third-type RS, a terminal device can receive the physical downlink channel data of the K1 ports by using the second-type RS of the K2 ports (for example, four ports).

In addition, an initialization interval of a sequence generator involved for the RS in this embodiment includes: $N_{init}$ subframes or radio frames, where $N_{init}$ is an integer greater than or equal to 1. In an optional implementation of this embodiment, an initialization value of the sequence generator for the RS is determined in at least one of the following manners: determining according to a PCID; determining according to the PCID and a CP type; determining according to an interval sequence number of sequence initialization for the RS and the PCID; and determining according to the interval sequence number of sequence initialization for the RS, the PCID, and the CP type.

In addition, in an optional implementation of this embodiment, the method in this embodiment may further include: in an in-band operation, indicating a sequence value and/or a port quantity of the second-type RS or the third-type RS in this embodiment by using signaling.

In addition, the method in this embodiment may further include: in an out-of-band operation, predefining a subframe for transmitting the RS in this embodiment and/or configuring a subframe for transmitting the RS in this embodiment by using signaling. A subframe for transmitting an SS is not used to transmit the RS or only an OFDM symbol used to transmit the SS in the subframe for transmitting the SS is not used to transmit the RS.

In addition, a sequence of the RS mentioned in this embodiment may be a subsequence whose length is 2 in an LTE system CRS sequence whose length is $2N_{RB}^{max,DL}$, where $N_{RB}^{max,DL}$ represents a maximum downlink bandwidth configuration (for example, 110 PRBs) of an LTE system. A segment of an existing LTE CRS sequence is extracted and used as the sequence of the RS. This, on one hand, does not cause a heavy loss in transmission performance, and on the other hand, avoids the need to design a completely new RS sequence, thereby reducing the workload for standardization of the sequence of the RS. Specifically, in this embodiment, the sequence of the RS may be obtained according to the following operations: predefining values of parameters $m_0$ and $m_1$ or indicating values of parameters $m_0$ and $m_1$ by using signaling (for example, by using PBCH signaling); and then, obtaining the sequence of the RS according to the parameters $m_0$ and $m_1$ and the following equation:

$$r_{l,n_s}(i) = \frac{1}{\sqrt{2}}(1 - 2 \cdot c(2m_i)) + j\frac{1}{\sqrt{2}}(1 - 2 \cdot c(2m_i + 1)), i = 0, 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP},$$

where $r_{l,n_s}(i)$ represents the sequence of the RS, $N_{ID}^{cell}$ represents a PCID, $n_s$ represents an index of a time slot, l represents an index of an OFDM symbol, $N_{CP}$ depends on a CP type and has a value 0 or 1, and $c_{init}$ represents an initialization value of a pseudorandom sequence $c(\cdot)$.

It should be noted that, when the values of parameters $m_0$ and $m_1$ are determined by using a predefining manner, the values of parameters $m_0$ and $m_1$ are respectively 0 and 1; or, the values of parameters $m_0$ and $m_1$ are respectively $N_{RB}^{max,DL}-1$ and $N_{RB}^{max,DL}$. Moreover, when the values of parameters $m_0$ and $m_1$ are indicated by using signaling, the values $\{m_0, m_1\}$ of the parameters belong to a predefined set. When the values of $m_0$ and $m_1$ are obtained through indication by using signaling for the in-band operation, the guard band operation, and the stand-alone operation, a same predefined set is used or different predefined sets are separately used for the in-band operation, the guard band operation, and the stand-alone operation. For example, for the in-band operation, to implement the flexible deployment of an NB-IOT system within band ranges other than 6 PRBs at the center of the bandwidth of an LTE system, a predefined set of values $\{m_0, m_1\}$ may be $\{0, 1\}, \{2, 3\}, \{4, 5\}, \ldots,$ $\{N_{RB}^{max,DL}-8, N_{RB}^{max,DL}-7\}, \{N_{RB}^{max,DL}+6, N_{RB}^{max,DL}+7\}, \{N_{RB}^{max,DL}+8, N_{RB}^{max,DL}+9\}, \ldots,$ and $\{2N_{RB}^{max,DL}-2, 2N_{RB}^{max,DL}-1\}$. For the guard band operation and the stand-alone operation, to simplify the design, a predefined set same as that of the in-band operation may continue to be used. However, from the perspective of reducing control overheads, the predefined set may be a subset of the predefined set of the in-band operation. Based on this, being subsets of the predefined set of the in-band operation, predefined sets of the guard band operation and the stand-alone operation may be the same or different. For example, for the stand-alone operation, the predefined set may be $\{0, 1\}, \{2, 3\}, \{4, 5\}, \ldots,$ and $\{14, 15\}$. For the guard band operation, the predefined set of the stand-alone operation may continue to be used, or, a new predefined set is defined.

In addition, in another optional implementation of this embodiment, when the RS is used to transmit PBCH data, and/or in an out-of-band operation, when the RS is used to transmit PDCCH data and PDSCH data, the values of parameters $m_0$ and $m_1$ are determined by using a predefining manner. During decoding of a PBCH, a terminal device may still not know the operation mode of the NB-IOT system. In this case, preferably, a predefined sequence of the first-type RS (equivalent to the predefined values of $m_0$ and $m_1$) is used to transmit the PBCH data. In the out-of-band operation, for transmission of the PDCCH data and the PDSCH data, backward compatibility with an LTE system is not needed. From the perspective of simplifying the design, preferably, a predefined sequence of the second-type RS or the third-type RS (equivalent to the predefined values of $m_0$ and $m_1$) is used to transmit the PDCCH data and the PDSCH data.

The RS sequence used to transmit PBCH data mentioned in the foregoing embodiment is the same as the RS sequence used to transmit PDCCH data and PDSCH data in the out-of-band operation. When the RS sequence used to transmit the PBCH data and the RS sequence used to transmit the PDCCH data and the PDSCH data in the out-of-band operation are both obtained by using a predetermined manner, to implement general design, the foregoing two sequences may be set to be a same sequence. In this case, the values of $(m_0, m_1)$ used to determine the sequence of the RS of the PBCH are the same as the values of $(m_0, m_1)$ used to determine the sequence of the RS of the PDCCH and PDSCH in the out-of-band operation.

In the in-band operation, when an LTE MBSFN subframe in which no MBMS service is transmitted is used to transmit NB-IOT physical downlink channel data, an RS is sent in an MBSFN area of the MBSFN subframe. When an LTE MBSFN subframe in which no MBMS service is transmitted is not used to transmit the NB-IOT physical downlink channel data, an RS is not sent in an MBSFN area of the MBSFN subframe. In the in-band operation, if a subframe is configured by a network to be an MBSFN subframe of an LTE system but in fact the subframe is not used to transmit an MBMS service of the LTE system, in this case, to improve resource utilization efficiency, the MBSFN subframe may be used as a usable subframe resource for the NB-IOT to transmit the NB-IOT physical downlink channel (for example, PDCCH or PDSCH) data. When the MBSFN subframe is used to transmit the NB-IOT physical downlink channel data, an RS (the first-type RS or the second-type RS or the third-type RS) used to demodulate the physical downlink channel data is sent together with physical channel data in an MBSFN area of the MBSFN subframe. Otherwise, when the MBSFN subframe is not used to transmit the NB-IOT physical downlink channel data, a corresponding NB-IOT RS (the first-type RS or the second-type RS or the third-type RS) is not sent in the MBSFN area of the MBSFN subframe, so as to avoid as much as possible the impact on data transmission of UE of the LTE system. An MBSFN area of an MBSFN subframe includes all OFDM symbols in the MBSFN subframe except the first two OFDM symbols. It should be noted that, the MBSFN area of the MBSFN subframe is a concept in the time domain, and in the frequency domain, an NB-IOT RS is sent within only the range of an NB-IOT narrowband (one PRB) but is not sent within a bandwidth range of the LTE system.

Through the above description of the implementations, it is clear to a person skilled in the art that the methods in the foregoing embodiments may be accomplished through software plus a necessary universal hardware platform, and definitely may also be accomplished through hardware. However, in most cases, the former implementation is preferred. Based on this, the technical solutions of the present invention essentially or the part that contributes to the prior art may be embodied in the form of a software product. The computer software product may be stored in a storage medium (for example, a read-only memory (ROM)/ Random Access Memory (RAM), a magnetic disk or an optical disc) and contain several instructions used to instruct a terminal device (for example, a mobile phone, a computer, a server, or a network device) to perform the methods according to the embodiments of the present invention.

A data transmission apparatus is further provided in this embodiment. The apparatus is configured to implement the foregoing embodiments and preferred implementations. Parts that have been described above will not be repeated here. As used hereinafter, the term "module" may be a combination of software and/or hardware that implements a predetermined function. Although the apparatus described in the following embodiments is preferably implemented by using software, the implementation of the apparatus by using hardware or a combination of software and hardware are also possible and conceivable.

Figure 2:
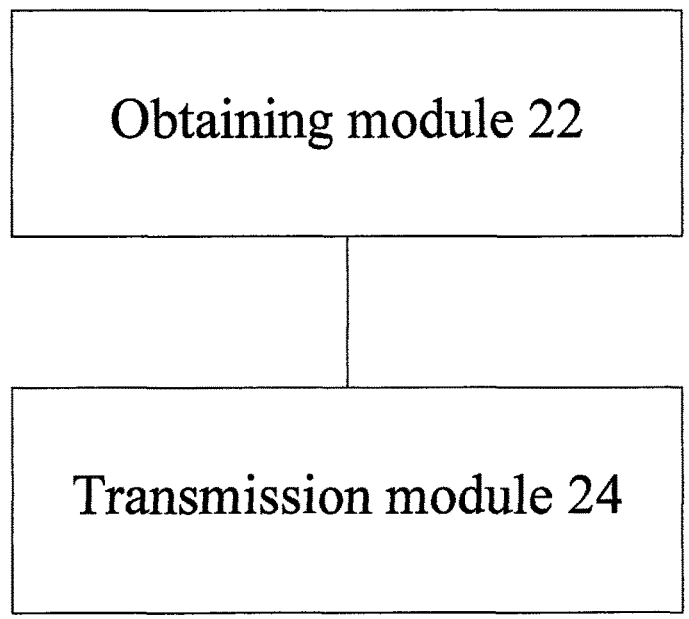
FIG. 2 is a structural block diagram of a data transmission apparatus according to an embodiment of the present invention.

FIG. 2 is a structural block diagram of a data transmission apparatus according to an embodiment of the present invention. As shown in FIG. 2, the apparatus includes:

an obtaining module 22, configured to obtain a type of an RS; and a transmission module 24, coupled and connected to the obtaining module 22, and configured to transmit physical downlink channel data according to an RS, where the RS includes a first-type RS, a second-type RS, and a third-type RS.

It should be noted that, the foregoing modules may be implemented by using software or hardware. Implementation by using hardware may be, but is not limited to, the following manners: the foregoing modules are located in a same processor; or, the foregoing modules are separately located in multiple processors.

The present invention is described below by way of example with reference to an optional embodiment of the present invention.

This optional embodiment provides a data transmission method. Steps of the method include: transmitting physical downlink channel data according to an RS: a first-type RS, a second-type RS, and a third-type RS.

The physical downlink channel includes, but is not limited to:

a PBCH, a PDCCH, and a PDSCH.

In this optional embodiment, at least for an out-of-band operation, an initialization interval of a sequence generator for the RS includes $N_{init}$ subframes or radio frames, where $N_{init}$ is an integer greater than or equal to 1.

In the related art, a sequence generator for a CRS in an LTE system is initialized on a per-OFDM symbol basis. For an NB-IOT system, if an initialization interval of a sequence of an OFDM symbol is still used, an NB-IOT RS occupies a relatively small quantity of resource units in each OFDM symbol due to the bandwidth restriction of one PRB. As a result, a very small quantity of sequence values are generated after each sequence initialization operation. This is very inefficient. For the NB-IOT system, to increase the sequence generation efficiency, one or more subframes or radio frames may be used as an interval to initialize a sequence of the NB-IOT RS.

An initialization value of the sequence generator for the RS may be determined in one of the following manners: determining according to a PCID, or determining according to the PCID and a CP type, or, determining according to an interval sequence number of sequence initialization for the RS and the PCID, or, determining according to the interval sequence number of sequence initialization for the RS, the PCID, and the CP type.

In addition, in this optional embodiment, a pattern of the first-type RS does not overlap a pattern of an LTE system CRS of four ports, that is, resource units occupied by the first-type RS do not overlap resource units occupied by the LTE system CRS of four ports or the resource units occupied by the LTE system CRS of four ports are no longer used to transmit the first-type RS. A pattern of the second-type RS is the same as a pattern of an LTE system CRS of two ports or four ports, or is a subset of the pattern of the LTE system CRS of two ports or four ports. That is, resource units occupied by the second-type RS are the same as resource units occupied by the LTE system CRS of two ports or four ports, or the resource units occupied by the second-type RS are a subset of the resource units occupied by the LTE system CRS of two ports or four ports. A pattern of the third-type RS is a superposition of the pattern of the first-type RS and the pattern of the second-type RS. That is, resource units occupied by the third-type RS include resource units occupied by the first-type RS and resource units occupied by the second-type RS. For an in-band operation, when the second-type RS or the third-type RS is used to transmit the physical downlink channel data, the RS and the data may have a same power level or different power levels because the second-type RS is equivalent to the LTE system CRS.

For any physical downlink channel, at least one of the three RS types may be supported. For example, for a PBCH channel, from the perspective of simplifying the design, only the first-type RS may be supported. For a PDCCH channel or a PDSCH channel, from the perspective of ensuring the balance between RS overheads and data transmission performance, the second-type RS and the third-type RS may be supported.

Using the pattern of the first-type RS of two ports as an example, that a pattern of the RS does not overlap a pattern of an LTE system CRS includes:

1) When a subframe in which the physical downlink channel data is transmitted is a normal subframe, that a pattern of the RS does not overlap a pattern of an LTE system CRS mentioned in this optional embodiment may be: The RS occupies positions of four LTE system CRS OFDM symbols in the time domain, where each OFDM symbol occupies four resource units. The pattern of the RS is set to have a fixed offset with respect to the pattern of the LTE system CRS. For example, the offset is fixed to be 1. This manner facilitates the direct reuse of related designs of the LTE system CRS. Alternatively, the RS occupies positions of four non-LTE system CRS OFDM symbols, where each OFDM symbol occupies four resource units. A fixed pattern of the RS is used. This manner helps minimize the design complexity. Alternatively, the RS occupies eight OFDM symbols, where the eight OFDM symbols include LTE system CRS and non-LTE system CRS OFDM symbols, and each OFDM symbol occupies two resource units. A further extension is made in the time domain. This manner helps maximize the power increase effect of the RS. In addition, all the foregoing manners also ensure that when the RS is for two ports, the quantity of occupied resource units does not exceed the quantity of resource units occupied by an LTE system CRS of two ports. That is, overheads of 16 resource units are kept. Each port corresponds to eight resource units.

2) When a subframe in which the physical downlink channel data is transmitted is a TDD system special subframe, that a pattern of the RS does not overlap a pattern of an LTE system CRS in this optional embodiment is: The RS occupies positions of one or two LTE system CRS OFDM symbols in the time domain, where each OFDM symbol occupies four resource units. Alternatively, the RS occupies positions of one or two non-LTE system CRS OFDM symbols, where each OFDM symbol occupies four resource units. Alternatively, the RS occupies positions of four non-LTE system CRS OFDM symbols, where each OFDM symbol occupies two or four resource units. Alternatively, the RS occupies positions of four OFDM symbols, including LTE system CRS and non-LTE system CRS OFDM symbols, where each OFDM symbol occupies two or four resource units. Because a quantity of OFDM symbols included in a downlink pilot time slot (DwPTSs) varies with different TDD system special subframe configurations, a pattern of a corresponding RS should depend on the quantity of OFDM symbols occupied by a DwPTS. Generally, a smaller quantity of OFDM symbols occupied by a DwPTS indicates a smaller quantity of resource units (overheads) occupied by the pattern of the corresponding RS. All the foregoing manners take different special subframe configurations into consideration.

In addition, when the OFDM symbols occupied by the RS are all non-LTE system CRS OFDM symbols, in this optional embodiment, the pattern of the RS may be fixed, or, may be determined according to a PCID. The use of a fixed pattern of the RS can minimize the design complexity. The determining of the pattern of the RS according to the PCID facilitates the reuse of existing designs of the LTE system CRS and reduction of interference between RSs of cells. For example, the pattern of the RS is determined according to the PCID and the following equation: Ipattern=mod(PCID, N), where N represents a quantity of candidate patterns of the RS, and Ipattern represents an index of a pattern of the RS within the range of 0 to N−1. In this case, if it is assumed that different candidate patterns of the RS have a fixed offset, for example, adjacent patterns of the RS have an offset of +1, patterns of RSs of two cells using different PCIDs have a fixed offset. The offset depends on values of the two PCIDs.

In another implementation of this optional embodiment, when the OFDM symbols occupied by the RS include non-LTE system CRS OFDM symbols and LTE system CRS OFDM symbols, a quantity of the non-LTE system CRS OFDM symbols is the same as a quantity of the LTE system CRS OFDM symbols. The pattern of the RS in the non-LTE system CRS OFDM symbol is fixed, and the pattern of the RS in the LTE system CRS OFDM symbol is determined according to a PCID. This manner helps ensure regular or uniform patterns of the RS. Alternatively, the pattern of the RS in the non-LTE system CRS OFDM symbol and the pattern of the RS in the LTE system CRS OFDM symbol are both determined according to the PCID, and the pattern of the RS in the non-LTE system CRS OFDM symbol has a fixed offset L with respect to the pattern of the RS in the LTE system CRS OFDM symbol in the frequency domain, where L is an integer greater than or equal to 0. This manner facilitates the reuse of existing design principles of an LTE system CRS and reduction of interference between RSs of cells.

For this optional embodiment, in an in-band operation and in an out-of-band operation, when a same type of RS is used to transmit the physical downlink channel data, the physical downlink channel data is transmitted according to different patterns of the RS, where the out-of-band operation is a guard band operation or a stand-alone operation. The same type of RS is the first-type RS, the second-type RS or the third-type RS. Specifically, for the first-type RS, different patterns of the RS are different patterns of the first-type RS. For the second-type RS, different patterns of the RS are different patterns of the second-type RS. For the third-type RS, different patterns of the RS are different patterns of the third-type RS. When the physical downlink channel data is transmitted according to different patterns of the RS, a pattern of the RS in the out-of-band operation is a subset of a pattern of the RS in the in-band operation. That is, resource units occupied by the pattern of the RS in the out-of-band operation are a subset of resource units occupied by the pattern of the RS in the in-band operation. For the first-type RS, the pattern of the first-type RS in the out-of-band operation is a subset of the pattern of the first-type RS in the in-band operation. For the second-type RS, the pattern of the second-type RS in the out-of-band operation is a subset of the pattern of the second-type RS in the in-band operation. For the third-type RS, the pattern of the third-type RS in the out-of-band operation is a subset of the pattern of the third-type RS in the in-band operation.

In another implementation of this optional embodiment, the type of the RS used to transmit the physical downlink channel data may be determined in one of the following manners: predefining, or, determining according to a coverage level and/or an aggregation level, or, indication by using signaling. For example, it may be predefined that PBCH data is always transmitted according to the first-type RS. It is assumed that the second-type RS or the third-type RS is used to transmit PDCCH data or PDSCH data. For a PDCCH channel, it may be determined according to the coverage level and/or the aggregation level whether to use the second-type RS or the third-type RS to transmit the PDCCH data. For a PDSCH channel, it may be determined according to the coverage level whether to use the second-type RS or the third-type RS to transmit the PDSCH data. In an extreme coverage scenario, the use of the second-type RS (having a density lower than that of the third-type RS) cannot provide accurate channel estimation. In view of this, generally, in a scenario with a relatively high coverage level and/or a relatively high aggregation level, the third-type RS may be used, or otherwise the second-type RS is used.

When the physical downlink channel data is transmitted according to the third-type RS and the pattern of the third-type RS is a superposition of the pattern of the first-type RS of K1 ports and the pattern of the second-type RS of K2 ports, where K1 and K2 are integers greater than 0 and K1 is less than K2, a transmit side maps the K1 ports to the K2 ports according to a precoding matrix of dimension K2×K1, and a receive side obtains an equivalent channel coefficient of the K1 ports according to the precoding matrix of dimension K2×K1 and an estimated channel coefficient of the K2 ports. For example, when the pattern of the third-type RS is a superposition of the pattern of the first-type RS of two ports and the pattern of the second-type RS of four ports, the transmit side maps two ports to four ports according to a precoding matrix of 4×2 dimension, and the receive side obtains an equivalent channel coefficient of two ports according to the precoding matrix of 4×2 dimension and an estimated channel coefficient of four ports.

In still another implementation, in the in-band operation, a sequence value and/or a port quantity of the second-type RS or the third-type RS is indicated by using signaling. In the in-band operation, when the second-type RS or the third-type RS is used to transmit the physical downlink channel data, in fact, it is equivalent that an existing in-band LTE system CRS is reused as the NB-IOT RS. Because the value of the LTE system CRS depends on the frequency position or PRB index of the CRS, related information (for example, PRB index information) about a sequence value of the RS needs to be notified, so as to implement channel estimation. In addition, when the NB-IOT system reuses a port quantity of the LTE system CRS, it may also be necessary to notify the port quantity of the RS.

Moreover, in the out-of-band operation, a subframe for transmitting the RS is predefined and/or configured by using signaling.

For example, for a standalone operation, the transmitted power spectral density of a base station greatly exceeds that of the in-band operation. In this case, even if an RS is not sent within the range of all subframes, accurate channel estimation may still be implemented. Therefore, to increase the peak data rate, only some subframes can be used to transmit the RS. A specific position (including a period and/or an offset) of a subframe for sending the RS may be indicated by using a predefining manner and/or by using a manner of signaling configuration. For example, it may be predefined that there is always RS transmission in a subframe for transmitting the PBCH data. Whether an RS exists in a subframe other than a PBCH subframe depends on a broadcast PBCH signaling configuration. In addition, to avoid the impact on the transmission of an SS and simplify the design, a subframe for transmitting the SS may be not used to transmit an RS or only an OFDM symbol used to transmit the SS in the subframe for transmitting the SS is not used to transmit the RS (for example, this is implemented by using a predefining manner or a manner of signaling configuration).

It may be seen that, in this optional embodiment, physical downlink channel data is transmitted according to a first-type RS, a second-type RS or a third-type RS, so that a balance between data transmission performance and RS overheads is ensured for different NB-IOT physical downlink channel data.

This optional embodiment is described in detail below with reference to the accompanying drawings and specific embodiments.

Embodiment 1

Figure 3:
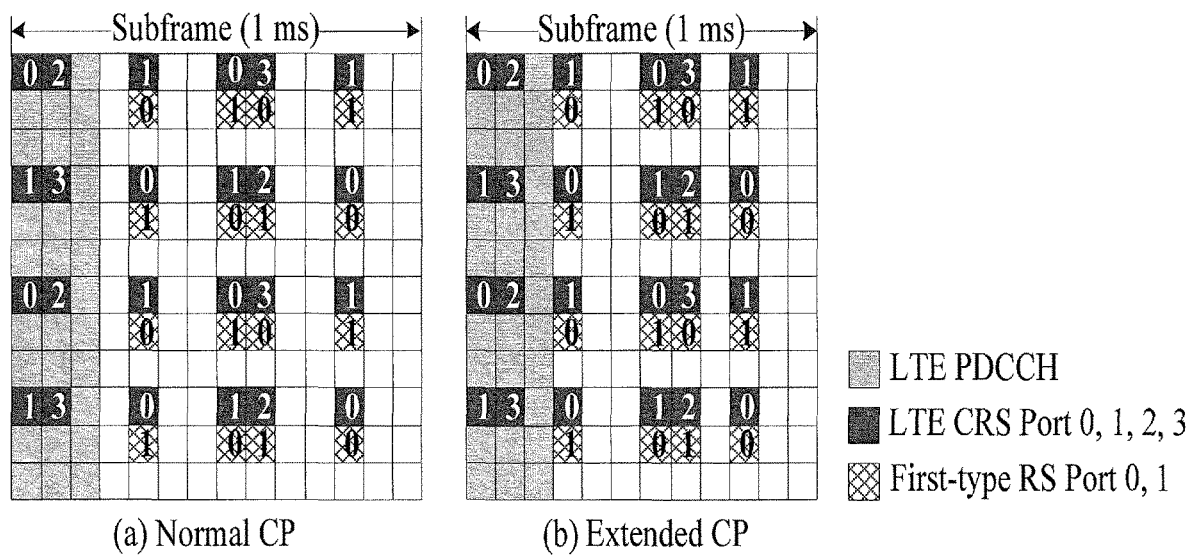
FIG. 3 is a first schematic diagram of a pattern of a first-type RS for a normal subframe according to an optional embodiment of the present invention.

FIG. 3 is a first schematic diagram of a pattern of a first-type RS for a normal subframe according to an optional embodiment of the present invention. As shown in FIG. 3, for a normal CP and an extended CP, the RS occupies four LTE CRS OFDM symbols in the time domain. Each OFDM symbol occupies four resource units. In an in-band operation, the first three OFDM symbols in a subframe may be used for transmitting a LTE downlink control channel PDCCH. The RS does not occupy the first three OFDM symbols in the time domain, and specifically occupies the rest four LTE CRS OFDM symbols other than the first three OFDM symbols in the time domain. Another is, in each LTE CRS OFDM symbol occupied by a RS in the time domain, the RS occupies same resource units in the frequency domain, and offsets of frequency domain positions of resource units occupied by the RS with respect to frequency domain positions of resource units occupied by the LTE CRS are fixed to be +1 (as counted starting from the upper sideband).

Figure 4:
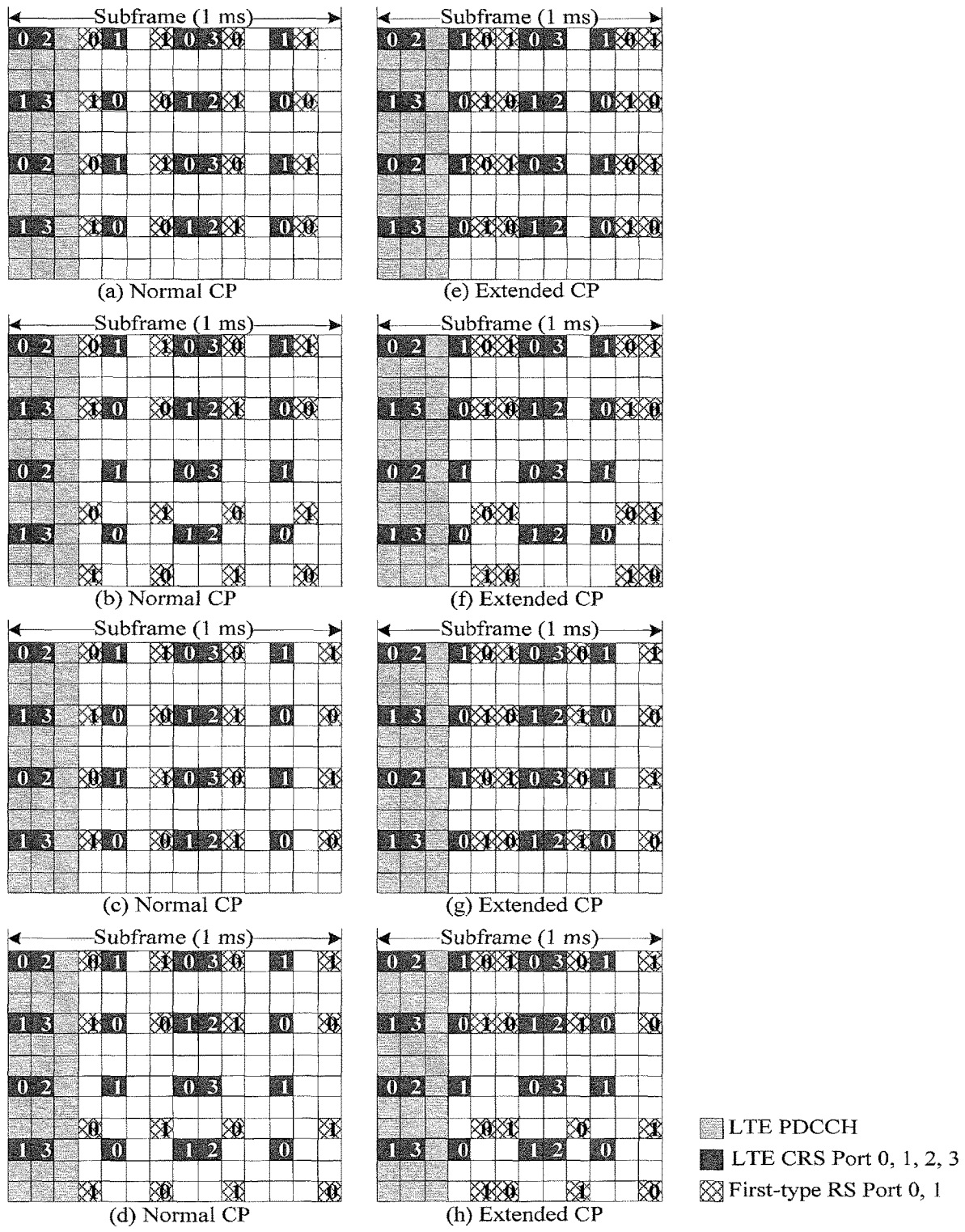
FIG. 4 is a second schematic diagram of a pattern of a first-type RS for a normal subframe according to an optional embodiment of the present invention.

FIG. 4 is a second schematic diagram of a pattern of a first-type RS for a normal subframe according to an optional embodiment of the present invention. The RS occupies positions of four non-LTE system CRS OFDM symbols in the time domain. Each OFDM symbol occupies four resource units. In an in-band operation, the first three OFDM symbols in the subframe may be used to transmit a PDCCH of an LTE system. The RS does not occupy the three OFDM symbols in the time domain, and specifically occupies positions of four non-LTE system CRS OFDM symbols other than the three OFDM symbols in the time domain. In addition, for each non-LTE system CRS OFDM symbol occupied by the RS in the time domain, the RS occupies positions of same resource units in the frequency domain. For example, a normal CP type is used as an example. As shown by (a) Normal CP in FIG. 4, sequence numbers of OFDM symbols occupied by the RS are 3, 6, 9, and 12, and sequence numbers of resource units occupied by the RS in the frequency domain are 0, 3, 6, and 9 (as counted starting from the upper sideband). As shown by (b) Normal CP in FIG. 4, sequence numbers of OFDM symbols occupied by the RS are 3, 6, 9, and 12, and sequence numbers of resource units occupied by the RS in the frequency domain are 0, 3, 8, and 11. As shown by (c) Normal CP in FIG. 4, sequence numbers of OFDM symbols occupied by the RS are 3, 6, 9, and 13, and sequence numbers of resource units occupied by the RS in the frequency domain are 0, 3, 6, and 9. As shown by (d) Normal CP in FIG. 4, sequence numbers of OFDM symbols occupied by the RS are 3, 6, 9, and 13, and sequence numbers of resource units occupied by the RS in the frequency domain are 0, 3, 8, and 11.

The pattern shown by (a) Normal CP in FIG. 4 ensures a uniform distribution of the RS in time and frequency dimensions. Although the pattern shown by (b) Normal CP in FIG. 4 only ensures a uniform distribution of the RS in time domain dimension, the performance of linear interpolation-based channel estimation in the frequency domain is improved by keeping the RS on two sides of a narrowband or a PRB. Although the pattern shown by (c) Normal CP in FIG. 4 only ensures a uniform distribution of the RS in frequency domain dimension, the performance of linear interpolation-based channel estimation in the time domain is improved by keeping the RS on two sides of a usable OFDM symbol area. For the pattern shown by (d) Normal CP in FIG. 4, the performance of linear interpolation-based channel estimation in both the time domain and the frequency domain is improved by keeping the RS on two sides of a usable OFDM symbol area and keeping the RS on two sides of a narrowband or a PRB.

It should be noted that the cases of extended CPs (e) to (h) in FIG. 4 are similar to the foregoing cases of normal CPs (a) to (d) in FIG. 4, and are no longer elaborated here.

Figure 5:
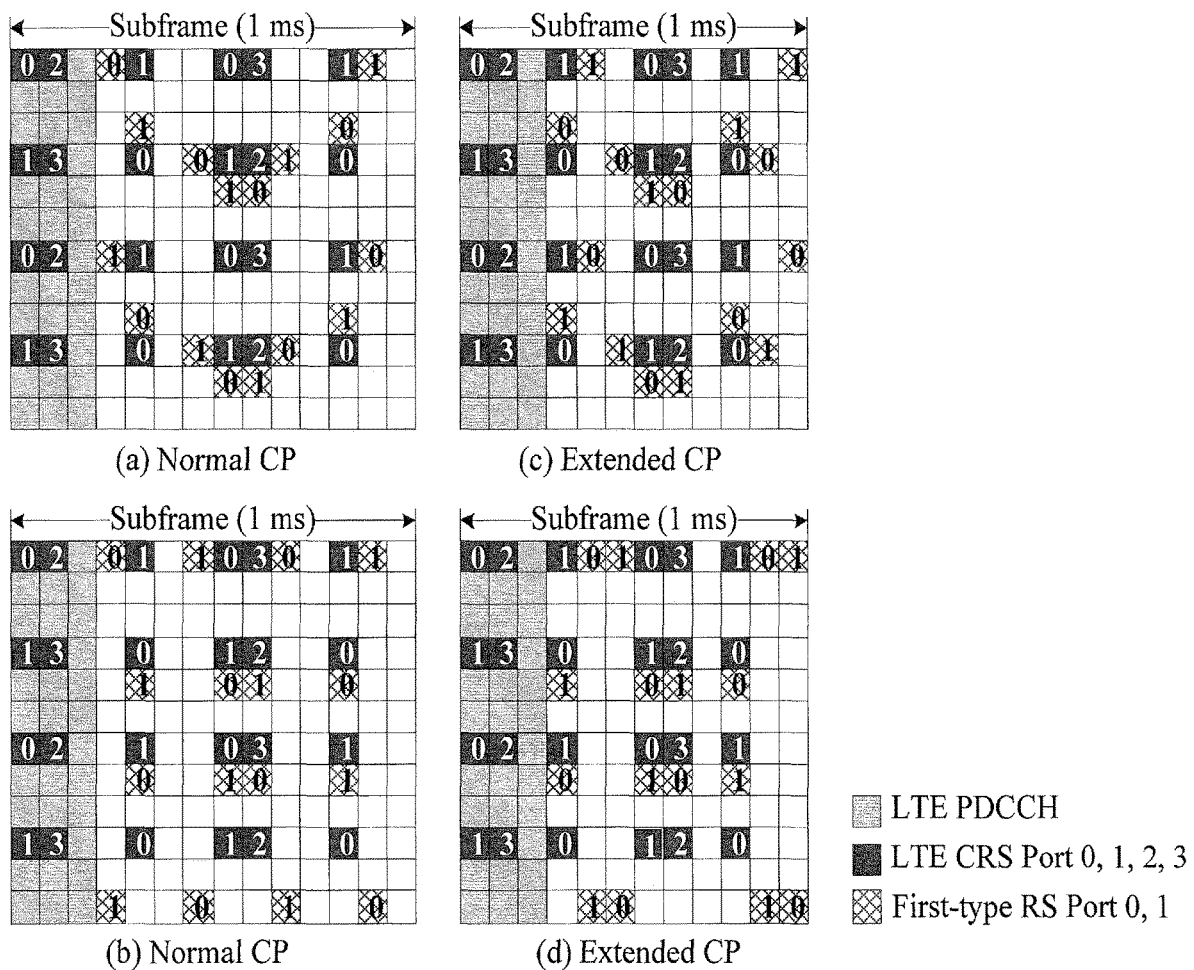
FIG. 5 is a third schematic diagram of a pattern of a first-type RS for a normal subframe according to an optional embodiment of the present invention.

FIG. 5 is a third schematic diagram of a pattern of a first-type RS for a normal subframe according to an optional embodiment of the present invention. As shown in FIG. 5, the RS occupies positions of eight OFDM symbols in the time domain. The eight OFDM symbols include LTE system CRS and non-LTE system CRS OFDM symbols, and each OFDM symbol occupies two resource units. In an in-band operation, the first three OFDM symbols may be used to transmit a PDCCH of an LTE system. The RS does not occupy the three OFDM symbols in the time domain, and specifically occupies positions of four non-LTE system CRS OFDM symbols and four LTE system CRS OFDM symbols other than the three OFDM symbols in the time domain. In addition, for each OFDM symbol occupied by the RS in the time domain, the RS occupies positions of different resource units in the frequency domain. For example, a normal CP type is used as an example. As shown by (a) Normal CP in FIG. 5, sequence numbers of non-LTE system CRS OFDM symbols occupied by the RS are 3, 6, 9, and 12, and sequence numbers of LTE system CRS OFDM symbols occupied by the RS are 4, 7, 8, and 11. For OFDM symbols 3 and 12, sequence numbers of resource units occupied by the RS in the frequency domain are 0 and 6 (as counted starting from the upper sideband). For OFDM symbols 6 and 9, sequence numbers of resource units occupied by the RS are 3 and 9. For OFDM symbols 4 and 11, offsets of positions of resource units occupied by the RS with respect to positions of two resource units (sequence numbers are 3 and 9) occupied by the LTE system CRS in the two OFDM symbols are −1. For OFDM symbols 7 and 8, offsets of positions of resource units occupied by the RS with respect to positions of two resource units (sequence numbers are 3 and 9) occupied by the LTE system CRS in the two OFDM symbols are +1. As shown by (b) Normal CP in FIG. 5, sequence numbers of non-LTE system CRS OFDM symbols occupied by the RS are 3, 6, 9, and 12, and sequence numbers of LTE system CRS OFDM symbols occupied by the RS are 4, 7, 8, and 11. For OFDM symbols 3, 6, 9, and 12, sequence numbers of resource units occupied by the RS are 0 and 11. For OFDM symbols 4, 7, 8, and 11, offsets of positions of resource units occupied by the RS with respect to positions of two resource units (sequence numbers are 3 and 6) occupied by the LTE system CRS in the OFDM symbols are +1.

Compared with (b) Normal CP in FIG. 5, the pattern shown by (a) Normal CP in FIG. 5 occupies more resource units in the frequency domain. This helps improve the performance of linear interpolation-based channel estimation in the frequency domain. In addition, compared with the pattern of (a) Normal CP, the pattern of (b) Normal CP has lower complexity and is easy to implement.

It should be noted that the cases of extended CPs (c) and (d) in FIG. 5 are similar to the foregoing cases of normal CPs (a) and (b) in FIG. 5, and are no longer elaborated here.

Embodiment 2

Figure 6:
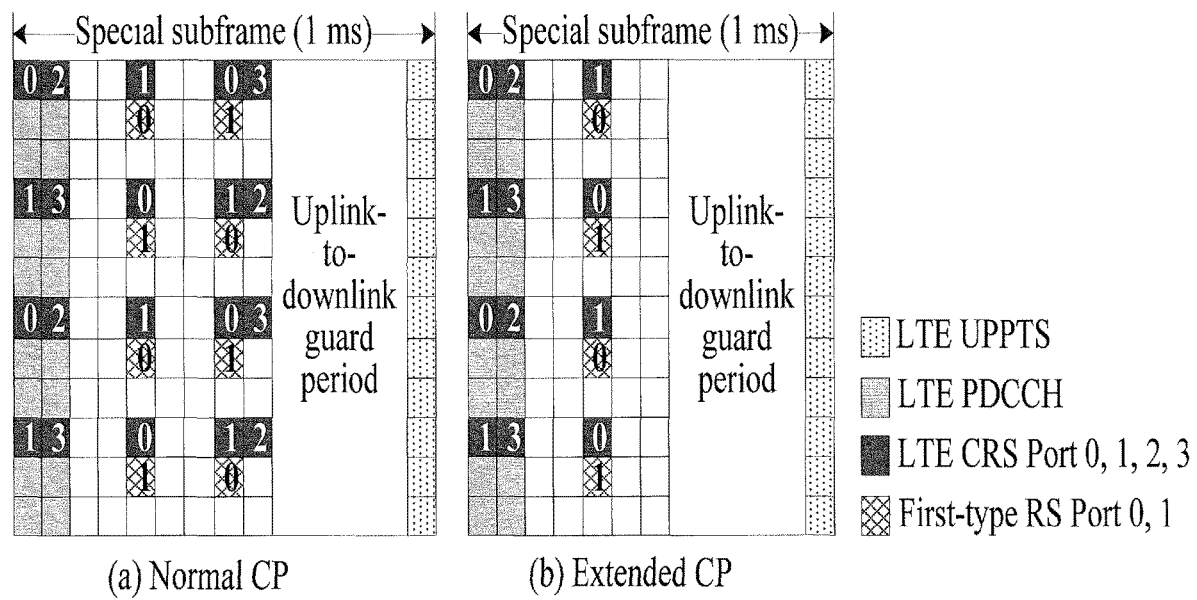
FIG. 6 is a first schematic diagram of a pattern of a first-type RS for a TDD system special subframe according to an optional embodiment of the present invention.

FIG. 6 is a first schematic diagram of a pattern of a first-type RS for a TDD system special subframe according to an optional embodiment of the present invention. In an in-band operation, two OFDM symbols located before a DwPTS may be used to transmit a PDCCH of an LTE system. The RS does not occupy the two OFDM symbols in the time domain, and specifically occupies positions of LTE system CRS OFDM symbols other than the two OFDM symbols in the time domain. For example, as shown by (a) Normal CP in FIG. 6, it is assumed that a configuration ratio of a TDD special subframe is 9:4:1. That is, nine OFDM symbols are used as the DwPTS, four OFDM symbols are used as an uplink-to-downlink guard period (GP), and one OFDM symbol is used as an uplink pilot time slot (UpPTS). The RS occupies positions of two LTE system CRS OFDM symbols in the time domain. Each OFDM symbol occupies four resource units. Specifically, sequence numbers of the occupied OFDM symbols are 4 and 7. For each LTE system CRS OFDM symbol, the RS occupies positions of same resource units in the frequency domain. Offsets of the resource units occupied by the RS with respect to positions of resource units occupied by the LTE system CRS in the OFDM symbol are +1 (as counted starting from the upper sideband). As shown by (b) Normal CP in FIG. 6, it is assumed that the configuration ratio of the TDD special subframe is 7:6:1. That is, seven OFDM symbols are used as the DwPTS, six OFDM symbols are used as the uplink-to-downlink GP, and one OFDM symbol is used as the UpPTS. The RS occupies a position of one LTE system CRS OFDM symbol in the time domain. Specifically, a sequence number of the occupied OFDM symbol is 4, and the RS occupies four resource units in the OFDM symbol. Offsets of the resource units occupied by the RS with respect to positions of resource units occupied by the LTE CRS in the OFDM symbol are +1 (as counted starting from the upper sideband).

Figure 7:
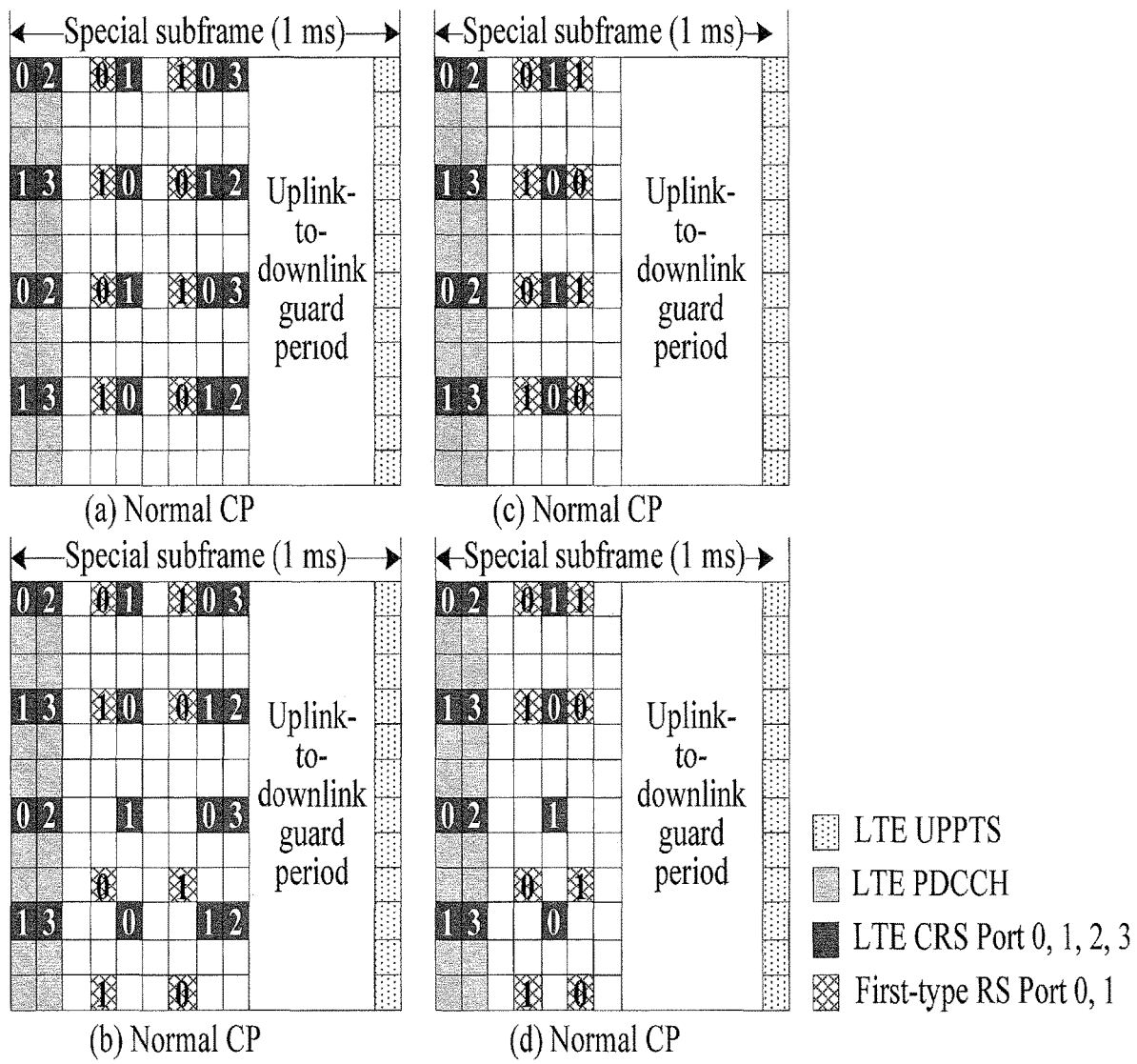
FIG. 7 is a second schematic diagram of a pattern of a first-type RS for a TDD system special subframe according to an optional embodiment of the present invention.

FIG. 7 is a second schematic diagram of a pattern of a first-type RS for a TDD system special subframe according to an optional embodiment of the present invention. In an in-band operation, two OFDM symbols located before a DwPTS may be used to transmit a PDCCH of an LTE system. The RS does not occupy the two OFDM symbols in the time domain, and specifically occupies positions of non-LTE system CRS OFDM symbols other than the two OFDM symbols.

As shown by (a) Normal CP in FIG. 7, it is assumed that a configuration ratio of the TDD special subframe is 9:4:1. That is, nine OFDM symbols are used as the DwPTS, four OFDM symbols are used as an uplink-to-downlink GP, and one OFDM symbol is used as an UpPTS. The RS occupies positions of two non-LTE system CRS OFDM symbols in the time domain. Each OFDM symbol occupies four resource units. Specifically, sequence numbers of the occupied OFDM symbols are 3 and 6. For each non-LTE system CRS OFDM symbol, the RS occupies positions of same resource units. Specifically, sequence numbers of the occupied resource units are 0, 3, 6, and 9 (as counted starting from the upper sideband).

As shown by (b) Normal CP in FIG. 7, it is assumed that a configuration ratio of the TDD special subframe is 9:4:1. That is, nine OFDM symbols are used as the DwPTS, four OFDM symbols are used as an uplink-to-downlink GP, and one OFDM symbol is used as an UpPTS. The RS occupies positions of two non-LTE system CRS OFDM symbols in the time domain. Each OFDM symbol occupies four resource units. Specifically, sequence numbers of the occupied OFDM symbols are 3 and 6. For each non-LTE system CRS OFDM symbol, the RS occupies positions of same resource units. Specifically, sequence numbers of the occupied resource units are 0, 3, 8, and 11 (as counted starting from the upper sideband).

The pattern shown by (a) Normal CP in FIG. 7 ensures a uniform distribution of the RS in frequency domain dimension, thereby helping simplify the implementation. For the pattern shown by (b) Normal CP in FIG. 7, the performance of linear interpolation-based channel estimation in the frequency domain is further improved by keeping the RS on two sides of a narrowband or a PRB.

As shown by (c) Normal CP in FIG. 7, it is assumed that a configuration ratio of the TDD special subframe is 7:6:1. That is, seven OFDM symbols are used as the DwPTS, six OFDM symbols are used as an uplink-to-downlink GP, and one OFDM symbol is used as an UpPTS. The RS occupies positions of two non-LTE system CRS OFDM symbols in the time domain. Each OFDM symbol occupies four resource units. Specifically, sequence numbers of the occupied OFDM symbols are 3 and 5. For each non-LTE system CRS OFDM symbol, the RS occupies positions of same resource units. Specifically, sequence numbers of the occupied resource units are 0, 3, 6, and 9.

As shown by (d) Normal CP in FIG. 7, it is assumed that a configuration ratio of the TDD special subframe is 7:6:1. That is, seven OFDM symbols are used as the DwPTS, six OFDM symbols are used as an uplink-to-downlink OP, and one OFDM symbol is used as an UpPTS. The RS occupies positions of two non-LTE system CRS OFDM symbols in the time domain. Each OFDM symbol occupies four resource units. Specifically, sequence numbers of the occupied OFDM symbols are 3 and 5. For each non-LTE system CRS OFDM symbol, the RS occupies positions of same resource units. Specifically, sequence numbers of the occupied resource units are 0, 3, 8, and 11.

Figure 8:
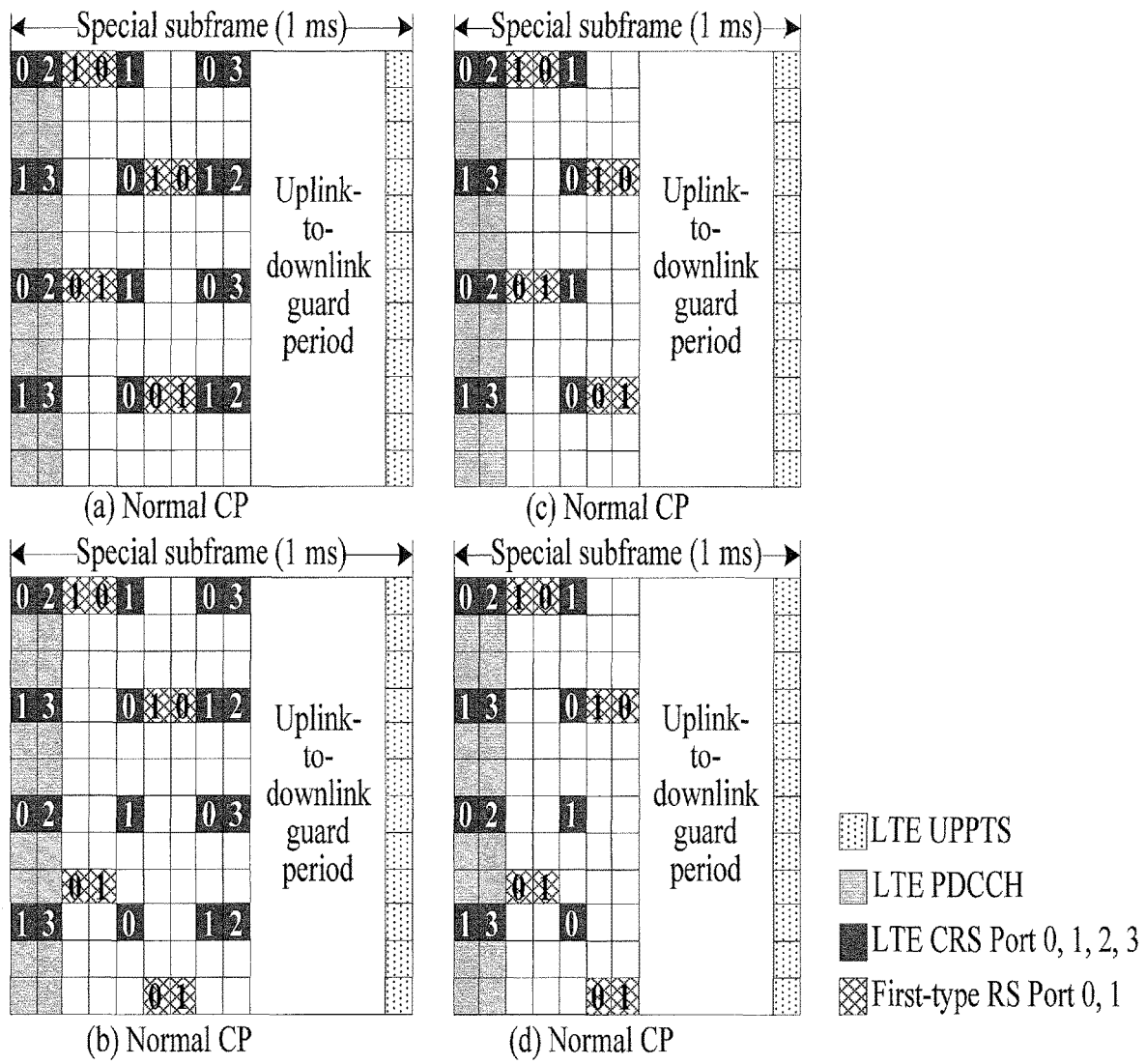
FIG. 8 is a third schematic diagram of a pattern of a first-type RS for a TDD system special subframe according to an optional embodiment of the present invention.

FIG. 8 is a third schematic diagram of a pattern of a first-type RS for a TDD system special subframe according to an optional embodiment of the present invention. In an in-band operation, two OFDM symbols located before a DwPTS may be used to transmit a PDCCH of an LTE system. The RS does not occupy the two OFDM symbols in the time domain, and specifically occupies positions of non-LTE system CRS OFDM symbols other than the two OFDM symbols.

As shown by a normal CP in FIG. 8, it is assumed that a configuration ratio of the TDD special subframe is 9:4:1. That is, nine OFDM symbols are used as the DwPTS, four OFDM symbols are used as an uplink-to-downlink GP, and one OFDM symbol is used as an UpPTS. The RS occupies positions of four non-LTE system CRS OFDM symbols in the time domain. Each OFDM symbol occupies two resource units. Specifically, sequence numbers of the occupied OFDM symbols are 2, 3, 5, and 6. For each non-LTE system CRS OFDM symbol, the RS occupies positions of different resource units. For OFDM symbols 2 and 3, sequence numbers of the occupied resource units in the frequency domain are 0 and 6. For OFDM symbols 5 and 6, sequence numbers of the occupied resource units in the frequency domain are 3 and 9 (as counted starting from the upper sideband). As shown by (b) Normal CP in FIG. 8, it is assumed that the configuration ratio of the TDD special subframe is 9:4:1. That is, nine OFDM symbols are used as the DwPTS, the four OFDM symbols are used as the uplink-to-downlink GP, and one OFDM symbol is used as the UpPTS. The RS occupies positions of the four non-LTE system CRS OFDM symbols in the time domain. Each OFDM symbol occupies two resource units. Specifically, sequence numbers of the occupied OFDM symbols are 2, 3, 5, and 6. For each non-LTE system CRS OFDM symbol, the RS occupies positions of different resource units. For OFDM symbols 2 and 3, sequence numbers of the occupied resource units in the frequency domain are 0 and 8. For OFDM symbols 5 and 6, sequence numbers of the occupied resource units in the frequency domain are 3 and 11 (as counted starting from the upper sideband). As shown by (c) Normal CP in FIG. 8 and by (d) Normal CP in FIG. 8, it is assumed that the configuration ratio of the TDD special subframe is 7:6:1. That is, seven OFDM symbols are used as the DwPTS, six OFDM symbols are used as the uplink-to-downlink GP, and one OFDM symbol is used as the UpPTS. The patterns of the RS are respectively similar to (a) Normal CP in FIG. 8 and (b) Normal CP in FIG. 8, and are no longer elaborated here. The pattern shown by (a) Normal CP in FIG. 8 ensures a uniform distribution of the RS in frequency domain dimension, thereby helping simplify the implementation. For the pattern shown by (b) Normal CP in FIG. 8, the performance of linear interpolation-based channel estimation in the frequency domain is further improved by keeping the RS on two sides of a narrowband or a PRB.

Figure 9:
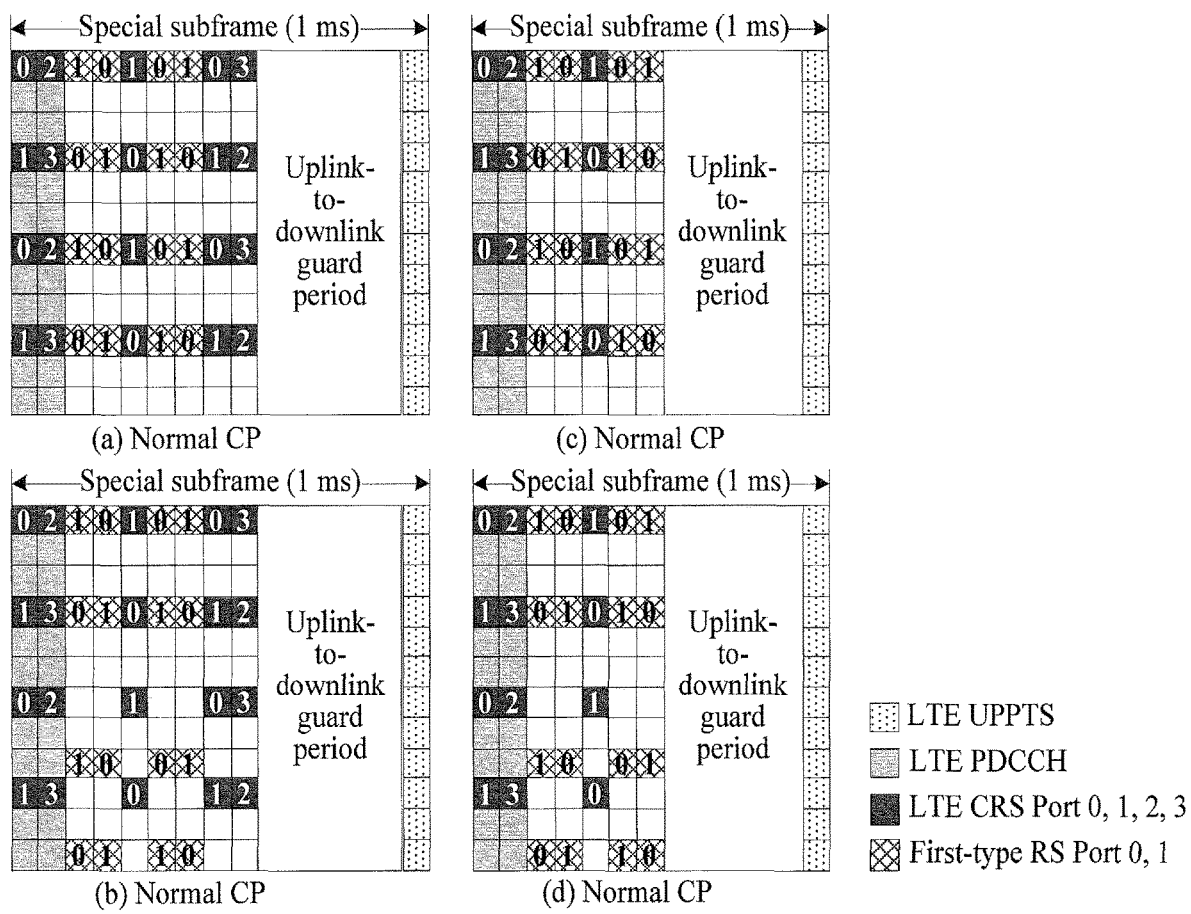
FIG. 9 is a fourth schematic diagram of a pattern of a first-type RS for a TDD system special subframe according to an optional embodiment of the present invention.

FIG. 9 is a fourth schematic diagram of a pattern of a first-type RS for a TDD system special subframe according to an optional embodiment of the present invention. In an in-band operation, two OFDM symbols located before a DwPTS may be used to transmit a PDCCH of an LTE system. The RS does not occupy the two OFDM symbols in the time domain, and specifically occupies positions of non-LTE system CRS OFDM symbols other than the two OFDM symbols.

As shown by (a) Normal CP in FIG. 9, it is assumed that a configuration ratio of the TDD special subframe is 9:4:1. That is, nine OFDM symbols are used as the DwPTS, four OFDM symbols are used as an uplink-to-downlink GP, and one OFDM symbol is used as an UpPTS. The RS occupies positions of four non-LTE system CRS OFDM symbols in the time domain. Each OFDM symbol occupies four resource units. Specifically, sequence numbers of the occupied OFDM symbols are 2, 3, 5, and 6. For each non-LTE system CRS OFDM symbol, the RS occupies positions of same resource units. Specifically, sequence numbers of the occupied resource units are 0, 3, 6, and 9 (as counted starting from the upper sideband). As shown by (b) in FIG. 9, it is assumed that the configuration ratio of the TDD special subframe is 9:4:1. That is, nine OFDM symbols are used as the DwPTS, the four OFDM symbols are used as the uplink-to-downlink GP, and one OFDM symbol is used as the UpPTS. The RS occupies positions of the four non-LTE system CRS OFDM symbols in the time domain. Each OFDM symbol occupies four resource units. Specifically, sequence numbers of the occupied OFDM symbols are 2, 3, 5, and 6. For each non-LTE system CRS OFDM symbol, the RS occupies positions of same resource units. Specifically, sequence numbers of the occupied resource units are 0, 3, 8, and 11 (as counted starting from the upper sideband).

The pattern shown by (a) Normal CP in FIG. 9 ensures a uniform distribution of the RS in frequency domain dimension, thereby helping simplify the implementation. For the pattern shown by (b) Normal CP in FIG. 9, the performance of linear interpolation-based channel estimation in the frequency domain is further improved by keeping the RS on two sides of a narrowband or a PRB. As shown by (c) Normal CP in FIG. 9 and by (d) Normal CP in FIG. 9, it is assumed that the configuration ratio of the TDD special subframe is 7:6:1.

That is, seven OFDM symbols are used as the DwPTS, six OFDM symbols are used as an uplink-to-downlink GP, and one OFDM symbol is used as the UpPTS. The pattern of the RS is respectively similar to (a) Normal CP in FIG. 9 and (b) Normal CP in FIG. 9, and is no longer elaborated here.

Embodiment 3

Figure 10:
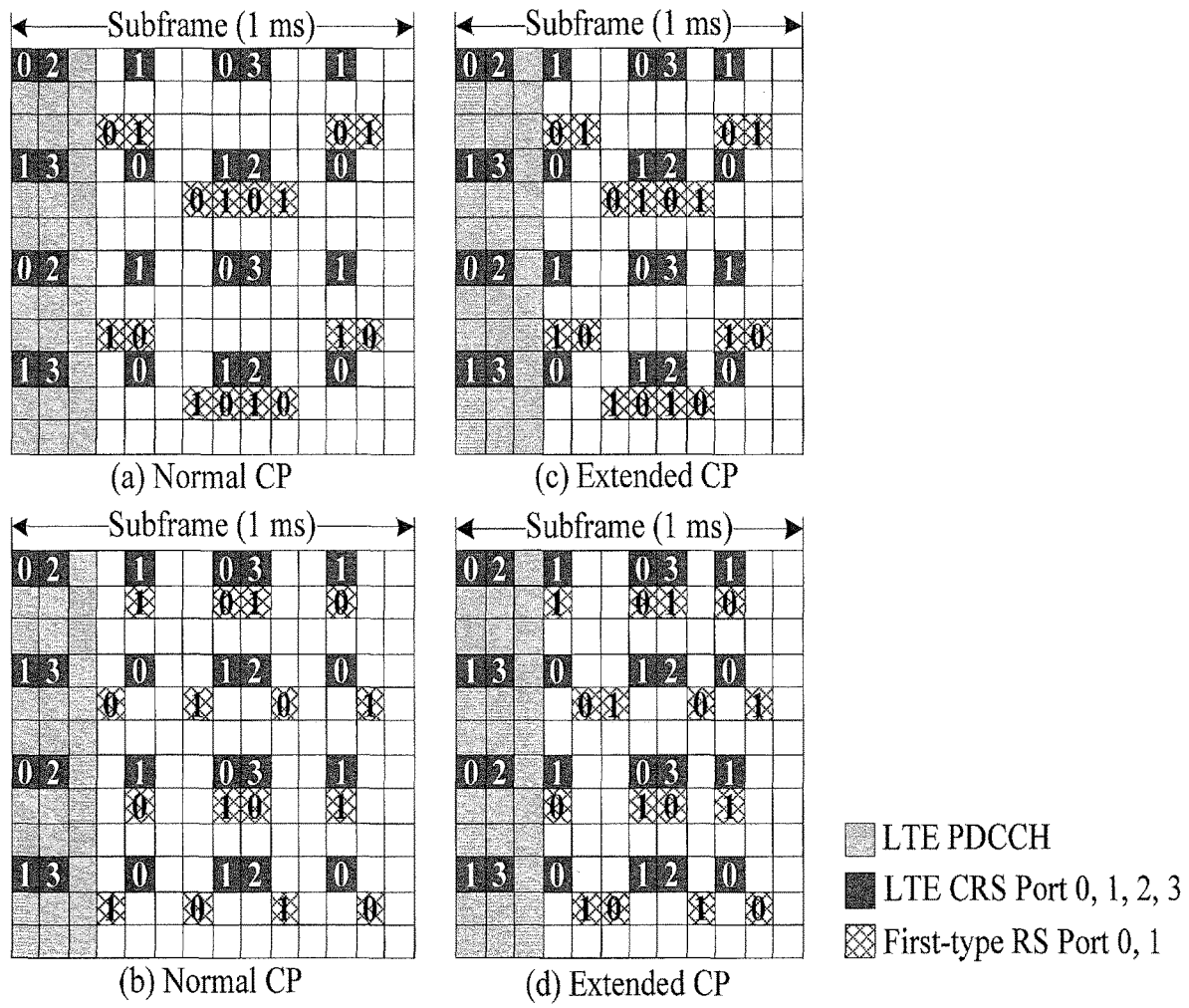
FIG. 10 is a schematic diagram of a pattern of an RS in a non-LTE system CRS OFDM symbol having a fixed offset with respect to a pattern of an RS in an LTE system CRS OFDM symbol according to an optional embodiment of the present invention.

FIG. 10 is a schematic diagram of a pattern of an RS in a non-LTE system CRS OFDM symbol having a fixed offset with respect to a pattern of an RS in an LTE system CRS OFDM symbol according to an optional embodiment of the present invention.

A normal CP type is used as an example. As shown by (a) Normal CP in FIG. 10, the RS occupies four non-LTE system CRS OFDM symbols (sequence numbers are 3, 6, 9, and 12) and four LTE system CRS OFDM symbols (sequence numbers are 4, 7, 8, and 11) in the time domain. For OFDM symbols 4 and 11, offsets of positions of two resource units occupied by the RS with respect to positions of two resource units (sequence numbers are 3 and 9) occupied by the LTE system CRS in the OFDM symbols are −1. For OFDM symbols 7 and 8, offsets of positions of two resource units occupied by the RS with respect to positions of two resource units (sequence numbers are 3 and 9) occupied by the LTE system CRS in the OFDM symbols are +1. It is assumed that the offset −1 or +1 is kept unchanged. When a pattern of the LTE system CRS is determined according to a PCID, the pattern of the RS in an LTE system CRS OFDM symbol is in fact also determined according to the PCID. For OFDM symbols 3, 6, 9, and 12, offsets of positions of two resource units occupied by the RS in the frequency domain sequentially with respect to positions of two resource units occupied in the four LTE system CRS OFDM symbols (sequence numbers are 4, 7, 8, and 11) are fixed to be 0. In this case, the pattern of the RS in a non-LTE system CRS OFDM symbol is also determined according to the PCID.

A normal CP type is used as an example. As shown by (b) Normal CP in FIG. 10, the RS occupies four OFDM symbols which are not occupied by LTE CRS (time domain index of these four OFDM symbols are 3, 6, 9, and 12) and four OFDM symbols which are occupied by LTE CRS (time domain index of these four OFDM symbols are 4, 7, 8, and 11) in the time domain. For OFDM symbols 4, 7, 8, and 11, offsets of positions of two resource units occupied by a RS with respect to positions of two resource units (indexes are 0 and 6) occupied by a LTE CRS in the OFDM symbols are +1. It is assumed that the foregoing offset +1 is kept unchanged. In the case of a pattern of the LTE CRS being determined according to a PCID, the pattern of the RS in an OFDM symbol which contains LTE CRS is in fact also determined according to the PCID. Offsets of positions of two resource units occupied by a RS in OFDM symbols 3, 6, 9, and 12 sequentially with respect to positions of two resource units occupied by the RS in four OFDM symbols (indexes are 4, 7, 8, and 11) which contain CRS are fixed to be 3. In this case, the pattern of the RS for PBCH in an OFDM symbol which does not contain CRS is also determined according to the PCID.

It should be noted that the cases of extended CPs (c) and (d) in FIG. 10 are similar to the foregoing cases of normal CPs (a) and (b) in FIG. 10, and therefore are no longer elaborated in this embodiment.

Embodiment 4

Figure 11:
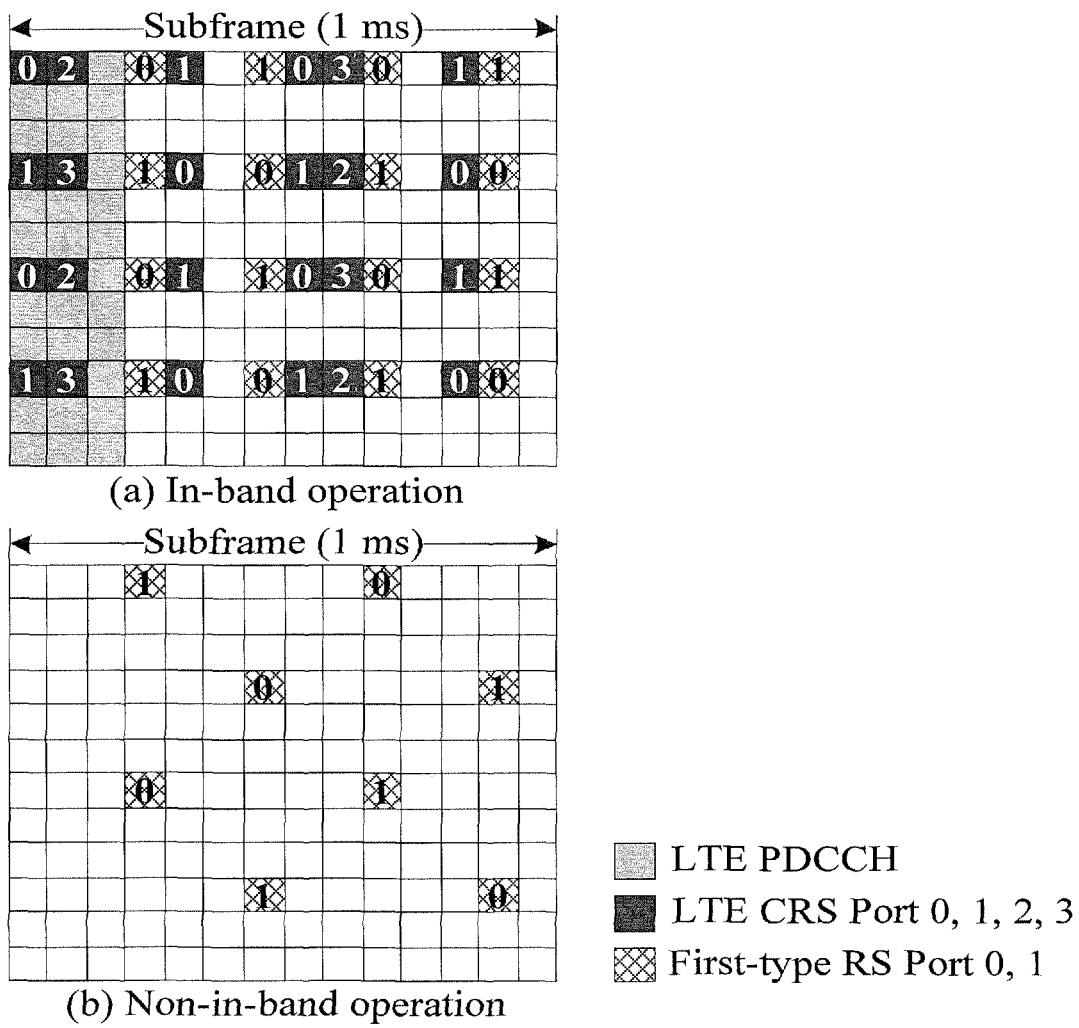
FIG. 11 is a schematic diagram of patterns of a first-type RS used to transmit physical downlink channel data in an in-band operation and in an out-of-band operation according to an optional embodiment of the present invention.

FIG. 11 is a schematic diagram of patterns of a first-type RS used to transmit physical downlink channel data in an in-band operation and in an out-of-band operation according to an optional embodiment of the present invention. It is assumed that in the in-band operation and in the out-of-band operation, the first-type RS of two ports is used to transmit the physical downlink channel data. In the in-band operation, as shown by (a) In-band operation in FIG. 11, the first-type RS of two ports occupies positions of four non-LTE system CRS OFDM symbols in the time domain. Each OFDM symbol occupies four resource units. Specifically, sequence numbers of the occupied OFDM symbols are 3, 6, 9, and 12, and sequence numbers of the occupied resource units are 0, 3, 6, and 9. For the out-of-band operation, as shown by (b) Out-of-band operation in FIG. 11, the first-type RS of two ports occupies positions of the four non-LTE system CRS OFDM symbols in the time domain. Each OFDM symbol occupies two resource units. Specifically, sequence numbers of the occupied OFDM symbols are the same as those in the in-band operation, that is, the sequence numbers are 3, 6, 9, and 12. For OFDM symbols 3 and 9, sequence numbers of the occupied resource units are 0 and 6. For OFDM symbols 6 and 12, sequence numbers of the occupied resource units are 3 and 9. A pattern of the first-type RS in the out-of-band operation is completely included in the pattern of the first-type RS in the in-band operation. That is, the pattern of the first-type RS in the out-of-band operation is a subset of the pattern of the first-type RS in the in-band operation.

Figure 12:
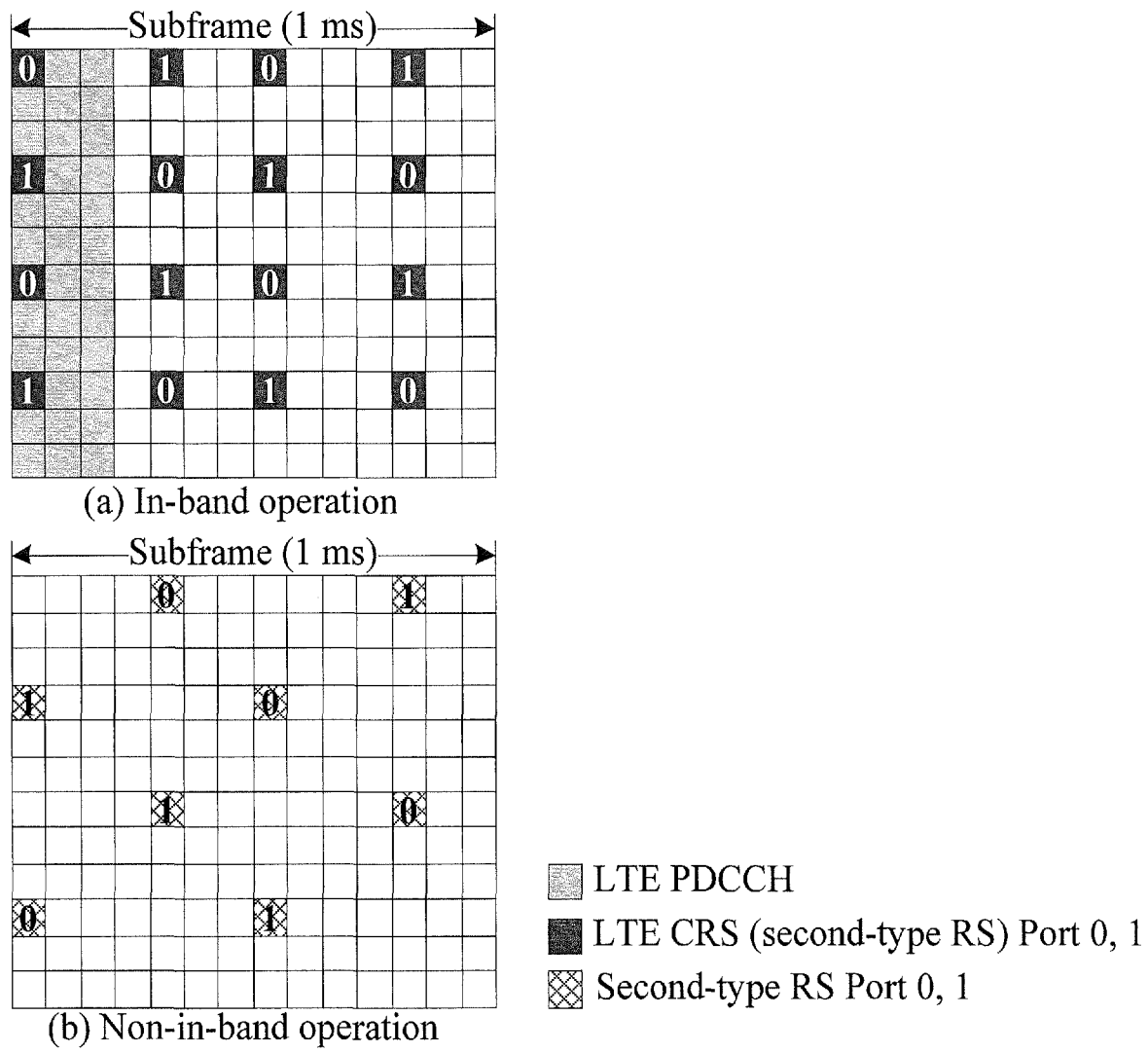
FIG. 12 is a schematic diagram of patterns of a second-type RS used to transmit physical downlink channel data in an in-band operation and in an out-of-band operation according to an optional embodiment of the present invention.

FIG. 12 is a schematic diagram of patterns of a second-type RS used to transmit physical downlink channel data in an in-band operation and in an out-of-band operation according to an optional embodiment of the present invention. It is assumed that in the in-band operation and in the out-of-band operation, the second-type RS of two ports is used to transmit the physical downlink channel data. In the in-band operation, as shown by (a) In-band operation in FIG. 12, the second-type RS of two ports is the LTE system CRS of two ports (port 0 and port 1), and occupies positions of four OFDM symbols in the time domain. Each OFDM symbol occupies four resource units. Specifically, sequence numbers of the occupied OFDM symbols are 0, 4, 7, and 11, and sequence numbers of the occupied resource units are 0, 3, 6, and 9. In the out-of-band operation, as shown in FIG. 12, the second-type RS of two ports occupies positions of the four OFDM symbols in the time domain. Each OFDM symbol occupies two resource units. Specifically, sequence numbers of the occupied OFDM symbols are the same as those in the in-band operation, that is, the sequence numbers are 0, 4, 7, and 11. For OFDM symbols 0 and 7, sequence numbers of the occupied resource units are 3 and 9. For OFDM symbols 4 and 11, sequence numbers of the occupied resource units are 0 and 6. Eventually, a pattern of the second-type RS in the out-of-band operation is completely included in a pattern of the second-type RS in the in-band operation. That is, the pattern of the second-type RS in the out-of-band operation is a subset of the pattern of the second-type RS in the in-band operation.

Figure 13:
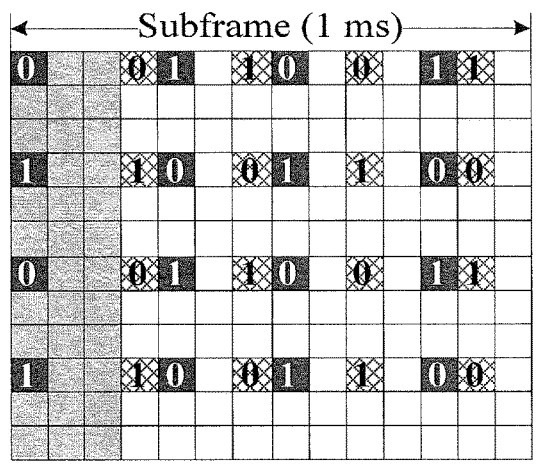
FIG. 13 is a schematic diagram of patterns of a third-type RS used to transmit physical downlink channel data in an in-band operation and in an out-of-band operation according to an optional embodiment of the present invention.
Figure 13:
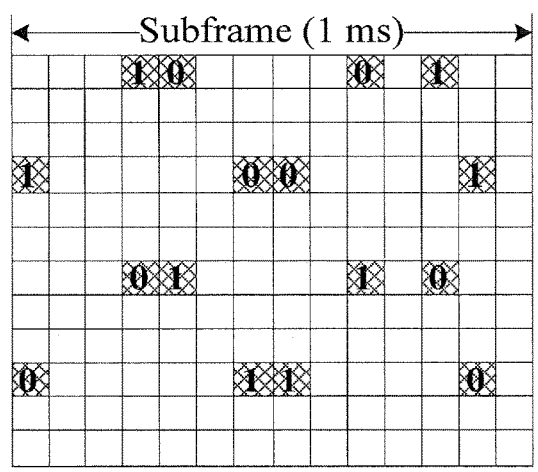

FIG. 13 is a schematic diagram of patterns of a third-type RS used to transmit physical downlink channel data in an in-band operation and in an out-of-band operation according to an optional embodiment of the present invention. It is assumed that in the in-band operation and in the out-of-band operation, the third-type RS of two ports is used to transmit the physical downlink channel data. In the in-band operation, as shown by (a) In-band operation in FIG. 13, a pattern of the third-type RS of two ports is a superposition of the pattern of the first-type RS of two ports shown by (a) In-band operation in FIG. 11 and the pattern of the second-type RS of two ports shown by (a) In-band operation in FIG. 12. The third-type RS of two ports occupies positions of eight OFDM symbols in the time domain. Each OFDM symbol occupies four resource units. Specifically, sequence numbers of the occupied OFDM symbols are 1, 3, 4, 6, 7, 9, 11, and 12, and sequence numbers of the occupied resource units are 0, 3, 6, and 9. In the out-of-band operation, as shown by (b) Out-of-band operation in FIG. 13, the pattern of the third-type RS of two ports is a superposition of the pattern of the first-type RS of two ports shown by (b) Out-of-band operation in FIG. 11 and the pattern of the second-type RS of two ports shown by (b) Out-of-band operation in FIG. 12. The third-type RS of two ports occupies positions of the eight OFDM symbols in the time domain. Each OFDM symbol occupies two resource units.

Specifically, sequence numbers of the occupied OFDM symbols are the same as those in the in-band operation, that is, the sequence numbers are 1, 3, 4, 6, 7, 9, 11, and 12. For OFDM symbols 3, 4, 9, and 11, sequence numbers of the occupied resource units are 0 and 6. For OFDM symbols 1, 6, 7, and 12, sequence numbers of the occupied resource units are 3 and 9. Eventually, the pattern of the third-type RS in the out-of-band operation is completely included in the pattern of the third-type RS in the in-band operation. That is, the pattern of the third-type RS in the out-of-band operation is a subset of the pattern of the third-type RS in the in-band operation.

Embodiment 5

When physical downlink channel data is transmitted according to a third-type RS, and a pattern of the third-type RS is a superposition of a pattern of a first-type RS of two ports and a pattern of a second-type RS of four ports, if it is assumed that the physical downlink channel data is transmitted on two ports, the following manner may be used to obtain, by using four ports RS, a channel coefficient of two ports of the physical downlink channel data transmitted on the two ports:

A transmitter maps two ports to four ports according to a precoding matrix of 4×2 dimension. For example, the foregoing process is implemented according to the following equation: $s_{4\times1} = W_{4\times2} \cdot s_{2\times1}$, where $s_{2\times1}$ and $s_{4\times1}$ respectively represent data on two ports before mapping and data on four ports after mapping, and $W_{4\times2}$ represents the precoding matrix.

A receive side obtains an equivalent channel coefficient of the two ports according to the precoding matrix $W_{4\times2}$ of 4×2 dimension and an estimated channel coefficient of four ports of the RS of four ports. For example, it is assumed that there is one receive antenna, and the foregoing process is implemented according to the following equation: $H_{1\times2}' = H_{1\times4} \cdot W_{4\times2}$, where $H_{1\times4}$ and $H'_{1\times2}$ respectively represent a channel coefficient matrix of four ports and an equivalent channel coefficient matrix of the two ports.

The same precoding matrix $W_{4\times2}$ may be used for different resource units.

For example, the precoding matrix $W_{4\times2}$ is always fixed to be the following form:

$$W_{4\times2} = \frac{1}{\sqrt{2}} \begin{bmatrix} 1 & 1 \\ 1 & e^{-j2\pi/4} \\ 1 & e^{-j4\pi/4} \\ 1 & e^{-j6\pi/4} \end{bmatrix}.$$

Alternatively, different precoding matrices $W_{4\times2}$ are used for different resource units.

For example, the precoding matrix $W_{4\times2}$ has the following form:

$$W_{4\times2}(i) = P(i)_{4\times2},$$

$$P(i)_{4\times2} \in \{P_0, P_1, L, P_{K-1}\}; \text{ or,}$$

$$W_{4\times2}(i) = P(i)_{4\times2} D(i)_{4\times2} U_{2\times2},$$

$$P(i)_{4\times2} \in \{P_0, P_1, L, P_{K-1}\},$$

$$D(i)_{4\times2} = \begin{bmatrix} 1 & 0 \\ 0 & e^{-j2\pi i/2} \end{bmatrix}, \text{ and } U_{2\times2} = \frac{1}{\sqrt{2}} \begin{bmatrix} 1 & 1 \\ 1 & e^{-j2\pi/2} \end{bmatrix}.$$

An effect of delay diversity can be achieved by introducing matrices $D(i)_{2\times2}$ and $U_{2\times2}$.

$W_{4\times2}(i)$ represents a precoding matrix of an $i^{th}$ resource unit.

$P_{4\times2}(i)$ is a matrix in a matrix set with a fixed or configurable size of K. A specific matrix is determined according to a resource unit index i.

Embodiment 6

A sequence of an RS is defined as follows:

$$r_n(m) = \frac{1}{\sqrt{2}}(1 - 2 \cdot c(2m)) + j\frac{1}{\sqrt{2}}(1 - 2 \cdot c(2m + 1)),$$

and $m = 0, 1, L, M - 1$, where $N_{init}$ is an initialization interval of a pseudorandom sequence generator, the unit being a subframe or a radio frame, n is a sequence number of an initialization interval (consecutive $N_{init}$ subframes or radio frames), and M is a quantity of resource units occupied by an RS port within the range of each initialization interval $N_{init}$.

A pseudorandom sequence c(·) is defined based on the prior art of an LTE system. The pseudorandom sequence generator performs initialization according to one of the following equations at the start of an initialization interval $N_{init}$:

$c_{init}=2^{10}\cdot(n+1)\cdot(2\cdot N_{ID}^{cell}+1)+2\cdot N_{ID}^{cell}+N_{CP}$, or, $c_{init}=(n+1)\cdot(2N_{ID}^{cell}+1)\cdot 2^{16}+N_{CP}$, or, $c_{init}=2^{10}\cdot(2\cdot N_{ID}^{cell}+1)+2\cdot N_{ID}^{cell}+N_{CP}$, or, $c_{init}=(2N_{ID}^{cell}+1)\cdot 2^{16}+N_{CP}$, or, $c_{init}=2^{10}\cdot(n+1)\cdot(2\cdot N_{ID}^{cell}+1+)+2\cdot N_{ID}^{cell}$, or $c_{init}=(n+1)\cdot(2N_{ID}^{cell}+1)\cdot 2^{16}$, or, $c_{init}=N_{ID}^{cell}$, where $$N_{CP} = \begin{cases} 1, \text{ for normal } CP \\ 0, \text{ for extended } CP, \end{cases}$$

and $N_{ID}^{cell}$ represents a PCID.

An embodiment of the present invention further provides a storage medium. Optionally, in this embodiment, the foregoing storage medium may be configured to store program code used to perform the following steps:

Step S1: Obtain a type of an RS.

Step S2: Transmit physical downlink channel data according to an RS, where the RS includes a first-type RS, a second-type RS, and a third-type RS.

Optionally, reference may be made to the examples described in the foregoing embodiments and optional implementations for specific examples in this embodiment, and are no longer elaborated here in this embodiment.

Obviously, a person skilled in the art should understand that the foregoing modules or steps of the present invention may be implemented by using a common computing apparatus. The modules or steps may be integrated into a single computing apparatus or distributed on a network formed of multiple computing apparatuses. Optionally, the modules or steps may be implemented by using program code executable by a computing apparatus. Therefore, the modules or steps may be stored in a storage apparatus and executed by a computing apparatus. In some cases, the shown or described steps may be performed in a sequence different from the sequence here, or the steps are separately manufactured into various integrated circuit modules, or multiple modules or steps of the modules or steps are manufactured into a single integrated circuit module for implementation. In this way, the present invention is not limited to any particular hardware and software combination.

The foregoing descriptions are merely preferred embodiments of the present invention, but are not intended to limit the present invention. A person skilled in the art may make various changes and variations to the present invention. Any modification, equivalent replacement, or improvement made within the spirit and principle of the present invention shall fall within the protection scope of the present invention.

INDUSTRIAL APPLICABILITY

By means of the embodiments of the present invention, physical downlink channel data is transmitted according to a first-type RS, a second-type RS or a third-type RS, so that a balance between data transmission performance and RS overheads is ensured for different NB-IOT physical downlink channel data, thereby resolving the problem in the related art of not knowing which RS is to be used to transmit NB-IOT physical channel data.

What is claimed is:

1. A method performed by a wireless communication node, comprising:
    determining a third-type reference signal (RS) based on a signaling indication,
    wherein a third pattern of the third-type RS comprises a superposition of a first pattern of a first-type RS and a second pattern of a second-type RS, wherein the first pattern is a pattern for an RS of K1 ports and does not overlap with a pattern of a cell-specific reference signal (CRS) in Long Term Evolution (LTE) system and the second pattern is the pattern of the CRS in LTE system with K2 ports, wherein K1 and K2 are positive integers greater than 0;
    determining a first sequence of the first-type RS, wherein the first sequence is a sub-sequence of a second sequence of a CRS, wherein a length of the second sequence is $2N_{RB}^{max,DL}$ and a length of the first sequence is 2, wherein $N_{RB}^{max,DL}$ a maximum downlink bandwidth in LTE system, wherein the determining a first sequence $r_{l,n_s}(i)$ of the first-type RS is performed based on $$r_{l,n_s}(i) = \frac{1}{\sqrt{2}}(1-2\cdot c(2m_i)) + j\frac{1}{\sqrt{2}}(1-2\cdot c(2m_i+1)), i=0,1$$

$$c_{init} = 2^{10}\cdot(7\cdot(n_s+1)+l+1)\cdot(2\cdot N_{ID}^{cell}+1)+2\cdot N_{ID}^{cell}+N_{CP}$$

wherein the value of $m_i$ is predefined, $N_{ID}^{cell}$ is a physical cell identity (PCID), $n_s$ is a time slot index, l is an orthogonal frequency-division multiplexing (OFDM) symbol index, $N_{CP}$ depends on a cyclic prefix (CP) type and has a value of 0 or 1, and $c_{init}$ is an initialization value of a pseudo-random sequence c(•); and
    transmitting the physical downlink channel data according to the third-type RS.

2. The method of claim 1, wherein $m_i=\{m_0, m_1\}$ when i=0 and 1 is one of the following: {0, 1}; and $\{N_{RB}^{max,DL}-1, N_{RB}^{max,DL}\}$.

3. The method of claim 1, further comprising:
    transmitting physical broadcast channel (PBCH) according to the third-type RS.

4. The method of claim 1, wherein:
    K1 is less than K2; and
    the method further comprises mapping the K1 ports to the K2 ports by a transmitter according to a precoding matrix of dimension K2×K1.

5. A device, comprising:
    at least one processor configured to determine a third-type reference signal (RS) based on a signaling indication,
    wherein a third pattern of the third-type RS comprises a superposition of a first pattern of a first-type RS and a second pattern of a second-type RS, wherein the first pattern is a pattern for an RS of K1 ports and does not overlap with a pattern of a cell-specific reference signal (CRS) in Long Term Evolution (LTE) system and the second pattern is the pattern of the CRS in LTE system with K2 ports, wherein K1 and K2 are positive integers greater than 0, wherein the at least one processor is further configured to obtain a first sequence of the first-type RS, wherein the first sequence is a sub-sequence of a second sequence of a CRS, wherein a length of the second sequence is $2N_{RB}^{max,DL}$ and a length of the first sequence is 2, wherein $N_{RB}^{max,DL}$ is a maximum downlink bandwidth in LTE system, wherein the first sequence $r_{l,n_s}(i)$ of the first-type RS is determined based on $$r_{l,n_s}(i) = \frac{1}{\sqrt{2}}(1 - 2 \cdot c(2m_i)) + j\frac{1}{\sqrt{2}}(1 - 2 \cdot c(2m_i + 1)), i = 0, 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

wherein the value of $m_i$ is predefined, $N_{ID}^{cell}$ is a physical cell identity (PCID), $n_s$ is a time slot index, $l$ is an orthogonal frequency-division multiplexing (OFDM) symbol index, $N_{CP}$ depends on a cyclic prefix (CP) type and has a value of 0 or 1, and $c_{init}$ is an initialization value of a pseudo-random sequence $c(\cdot)$; and a transmitter configured to transmit the physical downlink channel data according to the third-type RS.

6. The device of claim 5, wherein $m_i=\{m_0, m_1\}$ when i=0, and 1 is one of the following: $\{0, 1\}$; and $\{N_{RB}^{max,DL}-1, N_{RB}^{max,DL}\}$.

7. The device of claim 5, wherein the transmission module is further configured to transmit physical broadcast channel (PBCH) according to the third-type RS.

8. The device of claim 5, wherein:
K1 is less than K2; and
the at least one process is further configured to map the K1 ports to the K2 ports by a transmitter according to a precoding matrix of dimension K2×K1.

9. A method performed by a wireless communication device, comprising:
receiving the physical downlink channel data according to a third-type RS,
wherein a third pattern of the third-type RS comprises a superposition of a first pattern of a first-type RS and a second pattern of a second-type RS, wherein the first pattern is a pattern for an RS of K1 ports and does not overlap with a pattern of a cell-specific reference signal (CRS) in Long Term Evolution (LTE) system and the second pattern is the pattern of the CRS in LTE system with K2 ports, wherein K1 and K2 are positive integers greater than 0;

wherein the third-type reference signal (RS) is determined based on a signaling indication; and wherein the first-type RS comprises a first sequence, wherein the first sequence is a sub-sequence of a second sequence of a CRS, wherein a length of the second sequence is $2N_{RB}^{max,DL}$ and a length of the first sequence is 2, wherein $N_{RB}^{max,DL}$ is a maximum downlink bandwidth in LTE system, wherein the obtaining a first sequence $r_{l,n_s}(i)$ of the first-type RS is performed based on $$r_{l,n_s}(i) = \frac{1}{\sqrt{2}}(1 - 2 \cdot c(2m_i)) + j\frac{1}{\sqrt{2}}(1 - 2 \cdot c(2m_i + 1)), i = 0, 1$$

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

wherein the value of $m_i$ is predefined, $N_{ID}^{cell}$ is a physical cell identity (PCID), $n_s$ is a time slot index, $l$ is an orthogonal frequency-division multiplexing (OFDM) symbol index, $N_{CP}$ depends on a cyclic prefix (CP) type and has a value of 0 or 1, and is an initialization value of a pseudo-random sequence $c(\cdot)$.

10. The method of claim 9, wherein $m_i=\{m_0, m_1\}$ when i=0, and 1 is one of the following: $\{0, 1\}$; and $\{N_{RB}^{max,DL}-1, N_{RB}^{max,DL}\}$.

11. The method of claim 9, further comprising receiving physical broadcast channel (PBCH) according to the third-type RS.

12. The method of claim 9, wherein:
K1 is less than K2; and
the method further comprises obtaining at least one equivalent channel coefficient of the K1 ports according to a precoding matrix of dimension K2×K1 and at least one estimated channel coefficient of the K2 ports.

13. A non-transitory computer-readable medium having stored thereon computer-executable instructions for carrying out any one of claims 1-3, 5, 6-7, 9 and 10-11.

* * * * *